US012090718B2

(12) United States Patent
Knapp et al.

(10) Patent No.: US 12,090,718 B2
(45) Date of Patent: Sep. 17, 2024

(54) MACHINE LEARNING FOR SPLICE IMPROVEMENT

(71) Applicant: BRIDGESTONE AMERICAS TIRE OPERATIONS, LLC, Nashville, TN (US)

(72) Inventors: Kevin Ray Knapp, Nashville, TN (US); Anirban Kamal Bhattacharjee, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 17/626,453

(22) PCT Filed: Jul. 10, 2020

(86) PCT No.: PCT/US2020/041661
§ 371 (c)(1),
(2) Date: Jan. 11, 2022

(87) PCT Pub. No.: WO2021/011397
PCT Pub. Date: Jan. 21, 2021

(65) Prior Publication Data
US 2022/0203637 A1    Jun. 30, 2022

Related U.S. Application Data

(60) Provisional application No. 62/873,303, filed on Jul. 12, 2019.

(51) Int. Cl.
*B29D 30/00* (2006.01)
*G06N 20/00* (2019.01)
(Continued)

(52) U.S. Cl.
CPC ....... *B29D 30/005* (2013.01); *B29D 30/0061* (2013.01); *G06N 20/00* (2019.01);
(Continued)

(58) Field of Classification Search
CPC .............. B29D 30/005; B29D 30/0061; B29D 2030/0055; B29D 2030/0066;
(Continued)

(56) References Cited

U.S. PATENT DOCUMENTS

| 4,231,836 A | 11/1980 | Ljungqvist et al. |
| 10,725,463 B1 * | 7/2020 | Dixit ....................... G06F 17/15 |

(Continued)

FOREIGN PATENT DOCUMENTS

| CN | 101272898 | 9/2008 |
| CN | 102806675 | 12/2012 |

(Continued)

OTHER PUBLICATIONS

Zhang et al, "Tire Defects Classification Using Convolution Architecture for Fast Feature Embedding", 2018, Atlantis Press, International Journal of Computational Intelligence Systems, vol. II, Iss. I, pp. 1056-1066 (Year: 2018).*

(Continued)

*Primary Examiner* — James D. Rutten

(57) ABSTRACT

Systems and methods of machine learning for splice improvement. A system can receive, from one or more sensors, one or more values corresponding to manufacture of a tire by the one or more pieces of tire manufacturing equipment. The systems can determine one or more metrics based on the one or more values. The systems can generate a matrix based on the one or more values and the one or more metrics. The systems can predict, via input of the matrix into a machine learning model, a value for a splice tolerance metric. The systems can determine, based on the value for the splice tolerance metric, a parameter of at least one piece of equipment to adjust. The systems can provide a command to adjust the piece of equipment responsive to the value of the splice tolerance metric.

16 Claims, 8 Drawing Sheets

(51) Int. Cl.
    *G06N 3/045* (2023.01)
    *G06N 3/082* (2023.01)
    *G06N 3/084* (2023.01)
(52) U.S. Cl.
    CPC ............... *B29D 2030/0055* (2013.01); *B29D 2030/0066* (2013.01); *G06N 3/045* (2023.01); *G06N 3/082* (2013.01); *G06N 3/084* (2013.01)
(58) Field of Classification Search
    CPC ...... G06N 20/00; G06N 3/0454; G06N 3/082; G06N 3/084; Y02P 90/02; Y02P 90/30; B60C 2009/0408; B60C 2005/147
    USPC .......................................................... 700/197
    See application file for complete search history.

(56) References Cited

U.S. PATENT DOCUMENTS

| | | | |
|---|---|---|---|
| 2006/0137804 A1 | 6/2006 | Downing et al. | |
| 2007/0023952 A1* | 2/2007 | Bull ................... | B29C 48/92 425/149 |
| 2012/0267031 A1 | 10/2012 | Mawby et al. | |
| 2014/0338437 A1 | 11/2014 | Mawby et al. | |
| 2017/0241866 A1 | 8/2017 | Mawby | |
| 2018/0037221 A1* | 2/2018 | Myers ................ | G08G 1/0133 |
| 2020/0141653 A1* | 5/2020 | Kucera ............... | G06N 5/04 |
| 2021/0046689 A1* | 2/2021 | Sahrhage ........... | B29C 48/92 |

FOREIGN PATENT DOCUMENTS

| | | | | |
|---|---|---|---|---|
| CN | 203919755 | | 11/2014 | |
| CN | 206678425 | | 11/2017 | |
| CN | 107437243 | A * | 12/2017 | .......... G06T 7/0008 |
| CN | 108712972 | A | 10/2018 | |
| JP | 07-164815 | | 6/1995 | |
| JP | H07-164815 | | 6/1995 | |
| JP | 2005-537162 | | 12/2005 | |
| JP | 2008-280029 | | 11/2008 | |
| JP | 2016-099737 | | 5/2016 | |
| JP | 2017-027383 | | 2/2017 | |
| JP | 2018-151870 | | 9/2018 | |
| WO | WO-2004/022323 | | 3/2004 | |
| WO | WO-2010/126498 | A1 | 11/2010 | |
| WO | WO-2019/122218 | A1 | 6/2019 | |

OTHER PUBLICATIONS

Office Action for CN Application No. 202080055457.6, dated Jun. 29, 2022.
Office Action for JP Application No. 2022-501371, dated Aug. 2, 2022.
International Search Report and Written Opinion for PCT Application No. PCT/US2020/041661, dated Oct. 30, 2020.
Supplementary European Search Report issued in EP Application No. 20841587.7 dated Oct. 25, 2022.

* cited by examiner

MACHINE LEARNING FOR SPLICE IMPROVEMENT

CROSS-REFERENCE TO RELATED PATENT APPLICATIONS

The present application is the U.S. National Stage of PCT Application No. PCT/US2020/041661, filed Jul. 10, 2020, which claims priority to U.S. Provisional Patent Application No. 62/873,303, filed Jul. 12, 2019, the contents of which are incorporated herein by reference in their entirety.

BACKGROUND

Manufacturing plants can manufacture or build products or items using equipment and processes. Due to the complexity of products or items being built, and strict tolerances or quality requirements for the completed product or item, it can be challenging to efficiently manufacture products or items without defects or resource waste.

SUMMARY

This technical solution is directed to systems and methods of improving splices using machine learning. For example, tire production lines can include manufacturing equipment for manufacturing tires. The manufacturing equipment can use various splices to assemble a tire. The splices can be out of tolerance due to at least one parameter setting of the manufacturing equipment. The out of tolerance splices can trigger an alarm on the manufacturing equipment and delay operation time, or, if undetected, result in a defective tire or a tire not built to specification. Further, it can be challenging to detect whether a splice is out of tolerance between each manufacturing equipment, or timely detect whether a splice is out of tolerance prior to assembling the splices for a tire.

Systems and methods of this technical solution can improve splices using machine learning. The technical solution can reduce the number of defective products manufactured at a manufacturing plant, or increase the production rate of products that satisfy a tolerance specification or other quality specification. The technical solution can further reduce non-operational time for manufacturing equipment by automatically adjusting operational parameters of the manufacturing equipment without deactivating the manufacturing equipment.

At least one aspect is directed to systems of splice prediction and improvement, such as for manufacturing tires. The systems can include a data processing system. The data processing systems can include one or more processors and memory. The data processing systems can include an interface, input generator, model manager, equipment controller, data repository, or a machine learning engine. The data processing systems can receive, from one or more sensors of one or more pieces of tire manufacturing equipment in a tire manufacturing plant, one or more values corresponding to manufacture of a tire by the one or more pieces of tire manufacturing equipment. The data processing systems can determine one or more metrics based on the one or more values. The data processing systems can generate a matrix based on the one or more values and the one or more metrics. The data processing systems can predict, via input of the matrix into a machine learning model constructed to output tire manufacturing performance data, a value for a splice tolerance metric for the tire. The data processing systems can determine, based on the value for the splice tolerance metric, a parameter of at least one piece of equipment in the tire manufacturing plant to adjust. The data processing systems can provide a command to adjust the at least one piece of equipment in the tire manufacturing plant responsive to the value of the splice tolerance metric.

At least one aspect is directed to methods of splice prediction and improvement, such as for manufacturing tires. The methods can be performed by a data processing system having one or more processors and memory. The methods can include the data processing system receiving, from one or more sensors of one or more pieces of tire manufacturing equipment in a tire manufacturing plant, one or more values corresponding to manufacture of a tire by the one or more pieces of tire manufacturing equipment. The methods can include the data processing system determining one or more metrics based on the one or more values. The methods can include the data processing system generating a matrix based on the one or more values and the one or more metrics. The methods can include the data processing system predicting, via input of the matrix into a machine learning model constructed to output tire manufacturing performance data, a value for a splice tolerance metric for the tire. The methods can include the data processing system determining, based on the value for the splice tolerance metric, a parameter of at least one piece of equipment in the tire manufacturing plant to adjust. The methods can include the data processing system providing a command to adjust the at least one piece of equipment in the tire manufacturing plant responsive to the value of the splice tolerance metric.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
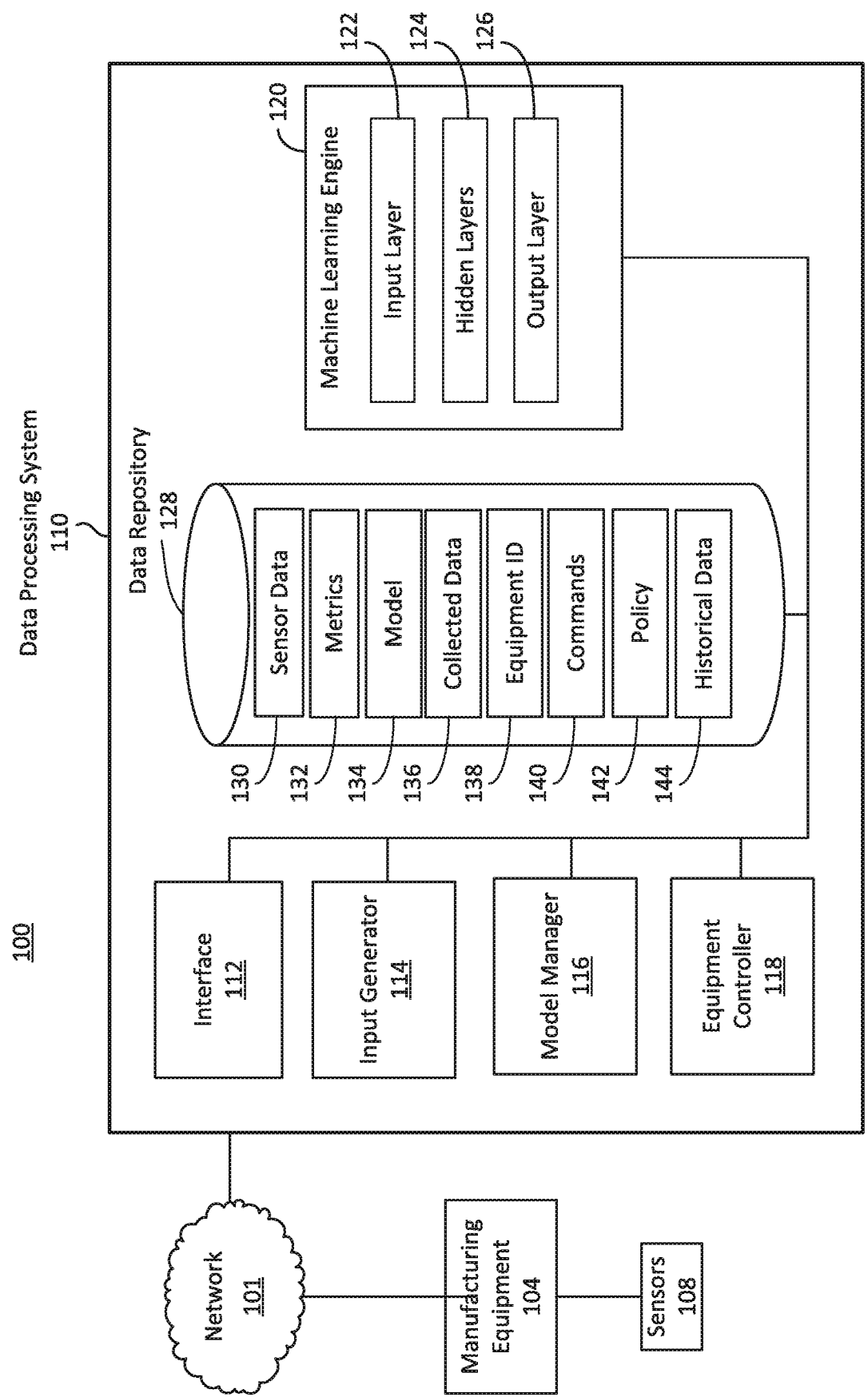
FIG. 1 depicts a block diagram depicting an example system of autonomous splice prediction and adjustment for manufacturing tires.

Following below are more detailed descriptions of various concepts related to, and implementations of, methods, apparatuses, and systems of improving splices using machine learning. The various concepts introduced above and discussed in greater detail below may be implemented in any of numerous ways.

This technical solution is directed to systems and methods of improving splices using machine learning. For example, tire production lines can include manufacturing equipment for manufacturing tires. The manufacturing equipment can use various splices to assemble a tire. The splices can be out of tolerance due to at least one parameter setting of the manufacturing equipment. The out of tolerance splices can trigger an alarm on the manufacturing equipment and delay operation time, or, if undetected, result in a defective tire or a tire not built to specification. Further, it can be challenging to detect whether a splice is out of tolerance between each manufacturing equipment, or timely detect whether a splice is out of tolerance prior to assembling the splices for a tire.

Systems and methods of this technical solution can improve splices using machine learning. The technical solution can reduce the number of defective products manufactured at a manufacturing plant, or increase the production rate of products that satisfy a tolerance specification. The technical solution can further reduce non-operational time for manufacturing equipment by automatically adjusting operational parameters of the manufacturing equipment without deactivating the manufacturing equipment.

For example, the technical solution can include a data processing system (or one or more processors) that can receive values corresponding to the manufacture of a product, such as a tire. The values can be sensed, measured, detected, or otherwise identified via manufacturing equipment or other devices in the manufacturing line or plant. The values can be received in real-time, such as during the manufacture of the product. The values can be received with a real-time data stream or data feed (e.g., data stream of values sampled at a predetermined rate, such as 1 Hz, 2 Hz, 3 Hz, 5 Hz, 10 Hz or other rate that facilitates improving splices). The data processing system can pre-process the received values to determine metrics based on those values, such as statistical metrics. The data processing system can generate or construct a matrix based on the received values and the generated statistical metrics. For example, the data processing system can generated a matrix that includes the received values (e.g., after any initial pre-processing to clean or filter the data values) as well as the statistical metrics associated with the received values. The data processing system can input the matrix into a machine learning model in order to predict, determine, or otherwise identify an output value. The output value can include an output matrix with one or more values based on the input matrix. The output of the machine learning model can include, for example, a classification as to whether an aspect or characteristic of the product being manufactured is in tolerance or out of tolerance. The output can further indicate a degree to which the aspect of or characteristic (e.g., a splice thickness or location) of the product (e.g., tire) being manufactured is out of tolerance. The data processing system, responsive to predicting the tolerance metric or other output value using the machine learning model (or one or more machine learning models constructed for one or more pieces of equipment or aspects related to the equipment), can determine whether to adjust, modify, or otherwise manipulate operation of a piece of equipment that is manufacturing the product in order to improve the aspect or characteristic of the product that is predicted or identified as being out of tolerance. The data processing system can generate a control command or instruction, and provide the instruction to the piece of equipment. For example, the data processing system can predict that a splice does not, or will not, satisfy a tolerance range, and then adjust a pressure roller to increase or decrease the pressure in order to improve the splice. Thus, by predicting whether a splice will be defective ahead of time, the data processing system can preemptively adjust the equipment in order to improve the splice, thereby reducing the likelihood, and number of, defective tires produced by the manufacturing equipment.

Thus, the technical solution can predict the out of tolerance splices prior to tire assembly, and automatically resolve the splice. The prediction can increase tire productivity by reducing the number of defective tires, or reducing non-operational time ("N.O.T."). The N.O.T. can be due to splice out of tolerance alarms on the manufacturing equipment. The manufacturing systems can include at least the manufacturing equipment, sensors, and data processing system, which can include the machine learning engine. The machine learning engine can be trained using historical data values associated to the manufacturing equipment. The historical data values can include values associated with an assembly of the splices, such as from previous out of tolerance splices assembly.

FIG. 1 depicts a block diagram depicting an example system of autonomous splice prediction and adjustment for manufacturing tires. The system 100 can include at least one data processing system 110 for use in out of tolerance splice prediction and parameter adjustment values. The parameter can be referred to as a characteristic. The data processing system 110 can include at least one interface 112, at least one input generator 114, at least one model manager 116, at least one equipment controller 118, at least one machine learning engine 120, and at least one data repository 128. The data processing system 110 can include hardware or a combination of hardware and software, such as communications buses, circuitry, processors, communications interfaces, among others. The data processing system 110 can reside on or within a computer or a cloud (e.g., remote device or system). For example, FIG. 1 shows a manufacturing equipment 104 in communication with the data processing system 110 via a network 101, such that the data processing system 110 can be remote to the manufacturing equipment 104.

The data repository 128 can include or store a sensor data structure 130, metrics data structure 132, a model data structure 134, a collected data structure 136, an equipment ID data structure 138, commands data structure 140, a policy data structure 142, and a historical data structure 144. The sensor data structure 124 can include information about available sensors, identifying information for the sensors, address information, internet protocol information, unique identifiers, data format, protocol used to communicate with the sensors, or a mapping of information type to sensor type or identifier. The sensor data structure 124 can further include or store information collected by sensors 108. The sensor data structure 124 can store sensor data using timestamps, date stamps, or other time related information. The sensor data structure 124 can store sensor data using equipment ID 138 stamp to associate the sensor data to at least one manufacturing equipment 104. The sensor data structure 124 can categorize the sensor data based on various types of values obtained from the manufacturing equipment 104. The types of values can include at least, for example, temperature data, splice deviation data, pressure data, velocity data, thickness data, positional data, orientation data, or load data.

Figure 4:
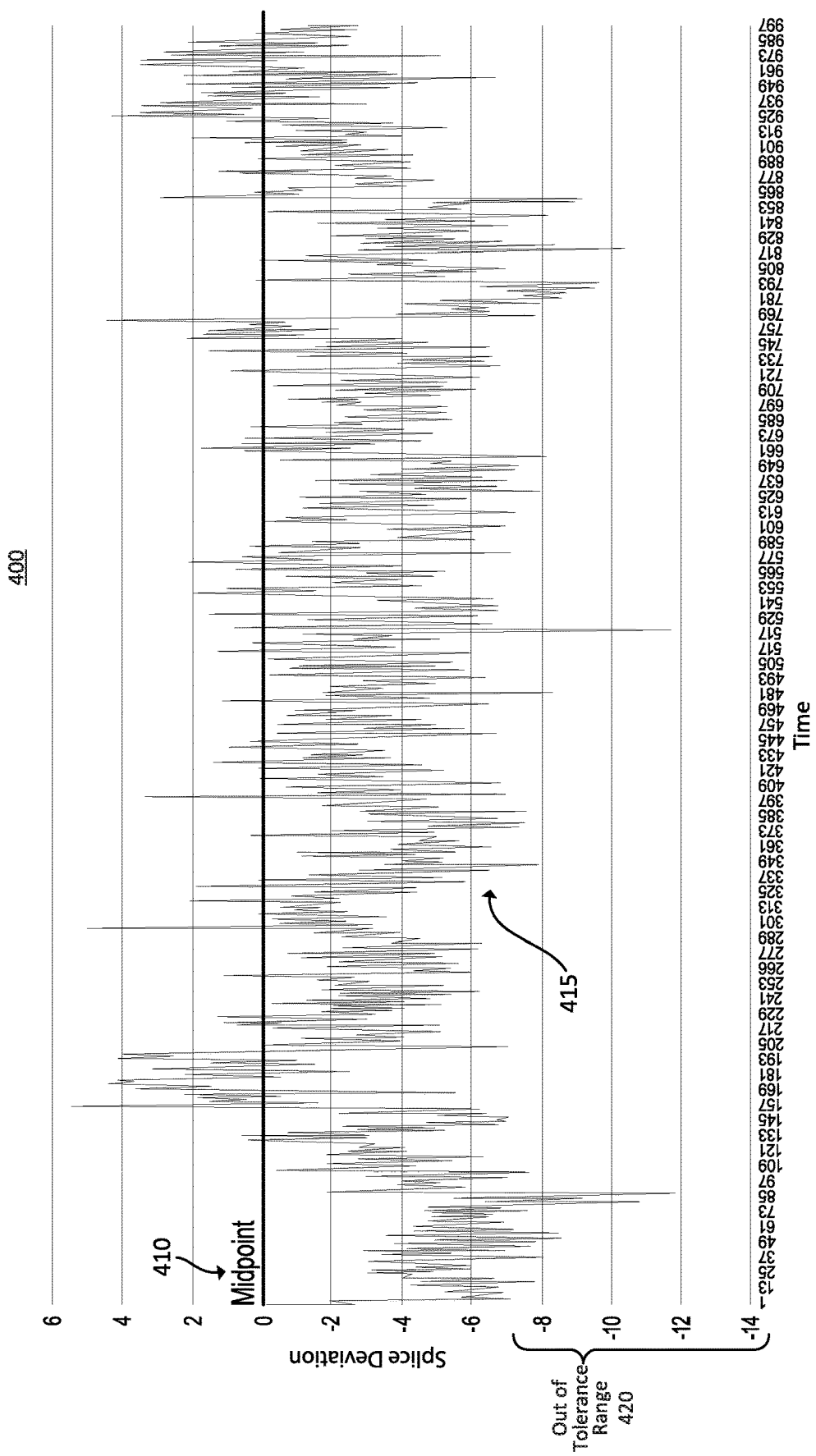
FIG. 4 depicts an example illustration of splice deviation from the mid-point/centerline, in accordance with an embodiment.
Figure 5:
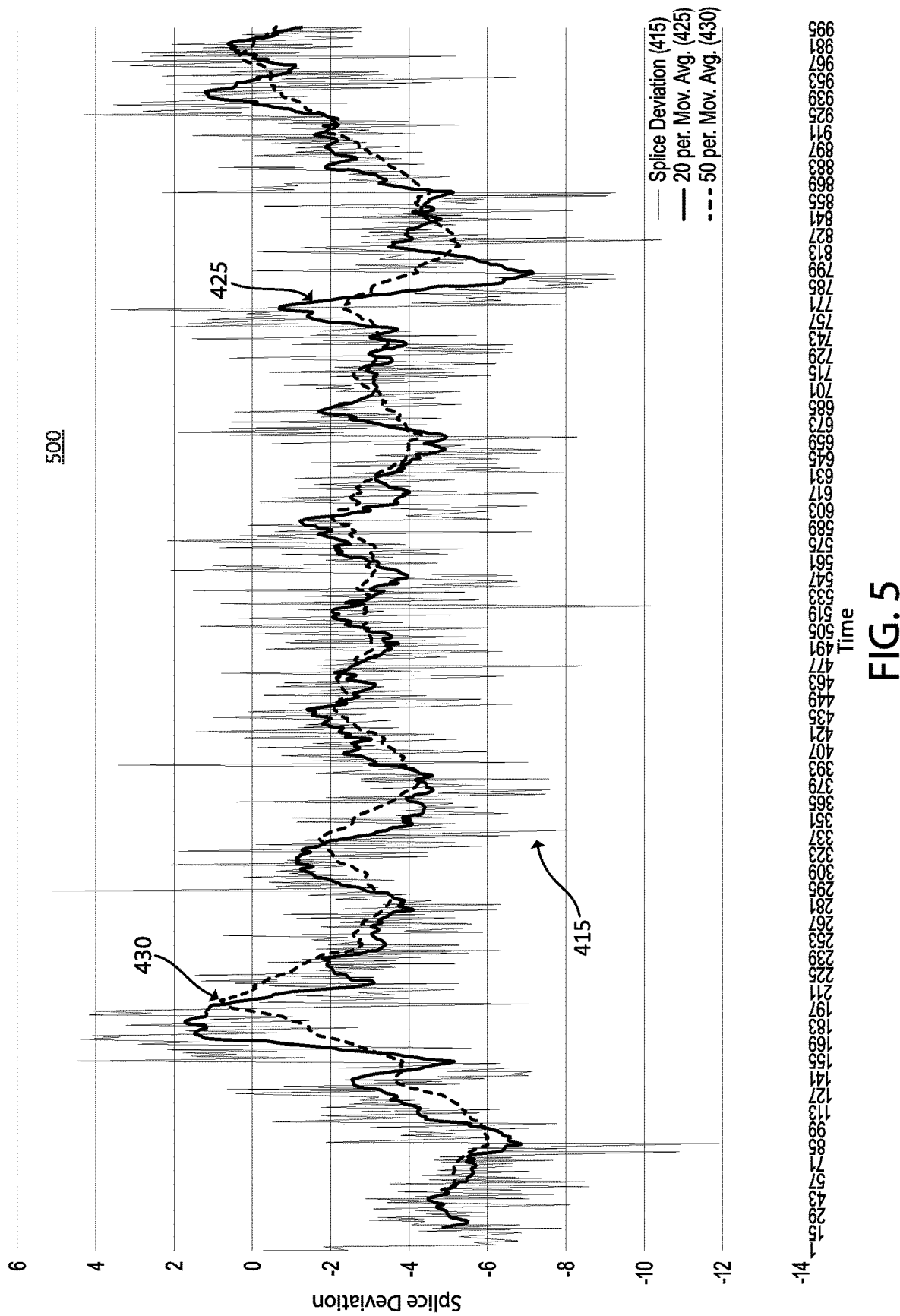
FIG. 5 depicts an example illustration of slope derivatives for splice deviation, in accordance with an embodiment.

The metrics data structure 132 can include, store, or maintain various metrics used to determine the tolerance of the splice. The metrics can refer to one or more functions to derive at least a splice deviation, splice tolerance, slope derivative, slope stability, or other functions related to dataset analysis, such as shown in FIGS. 4 and 5. The metrics data structure 132 can associate the metrics with the sensor data corresponding to the manufacturing equipment 104. For example, the sensors 108 can provide values of positional or orientation data type corresponding to a manufacturing equipment 104. The values can be stored in the sensor data structure 130. The values of the sensors 108 can be associated with at least one metric for compilation of data to generate at least one matrix for the machine learning engine 120.

The metrics data structure 132 can further include or store one or more matrix based on at least the values or types of values from the sensors data structure 130 or the metrics from the metrics data structure 132. The metrics data structure 132 can store a generated matrix by accumulating the values from the sensors 108 and compiling the values with at least one metric. The matrix can include confusion matrix, accuracy matrix, precision matrix, sensitivity matrix, specificity matrix, or other related matrix appropriate for the machine learning engine 120 input. The metrics data structure 132 can rearrange or categorize the values associated with the metric to store in the matrix as an input for the machine learning engine 120. The metrics data structure 132 can be updated or manipulated by the data processing system 110.

The model data structure 134 can include, maintain, or store a plurality of models from or for the machine learning engine 120. The model can be referred to as a machine learning model. The models can include at least, for example, Deep Boltzmann Machine model, Deep Belief Networks model, Convolutional Neural Network ("CNN") model, or Stacked Auto-Encoders model. The model data structure 134 can provide or store the models for or from the machine learning engine 120. The model data structure 134 can be updated or manipulated by the data processing system 110.

The collected data structure 136 can include or store one or more values generated from the machine learning engine 120. The values can include at least one prediction value, such as the parameter values associated with the manufacturing equipment 104. The prediction value can indicate a sequence of in tolerance and out of tolerance splices. For example, the collected data structure 136 can store a plurality of prediction values from the machine learning engine 120. The prediction values can indicate a parameter for each of a plurality of succeeding splices associated with the manufacturing equipment 104. The collected data structure 136 can be updated or manipulated by the data processing system 110.

The equipment ID data structure 138 can include or store information associated with the manufacturing equipment 104. The information can include a name, model, make, date manufactured, routing number, or other identifier to identify the manufacturing equipment 104 from the plurality of manufacturing equipment. The equipment ID data structure 138 can categorize or bundle the information corresponding to each manufacturing equipment to, for example, a subset of the manufacturing equipment 104. The equipment ID data structure 138 can be updated or manipulated by the data processing system 110, such as when replacing the manufacturing equipment 104.

The commands data structure 140 can include or store commands for output to the manufacturing equipment 104. The commands can be referred to, or use interchangeably with other descriptive terms, such as instructions, programs, scripts, or controls. The data processing system 110 can provide the commands to the manufacturing equipment 104. The commands can, for example, initiate, pause, continue, or stop the operation of the manufacturing equipment 104. The commands can be further provided to, for example, configure maneuvering speed, orientation, timing, pressure, alignment, and/or other operations compatible with the manufacturing equipment 104. The commands data structure 140 can be updated or manipulated by the data processing system 110.

The policy data structure 142 can include or store one or more policies associated to each of the manufacturing equipment 104. The policies can be referred to as thresholds for determining the tolerance of the splice. The policies can include, for example, a midpoint, minimum point, maximum point, or other indicator for determining a tolerance range. The minimum point or the maximum point can identify a point to exceed for the splice to be out of tolerance. The tolerance range for each manufacturing equipment 104 can differ based on at least one information from the equipment ID 138. The policy data structure 142 can be updated or manipulated by the data processing system 110.

The historical data structure 144 can include or store historical data such as information about historical sensor values, training sets used to train or tune neural networks, user preferences, tire information/recipe, prior prediction information, or prior parameter adjustments information. Tuning a neural network can refer to or include a process of machine learning in which training data sets including historical data are provided to the neural network for processing. Tuning can refer to or include training or processing of the neural network to allow the neural network to improve accuracy. Tuning the neural network can include, for example, designing the neural network using architectures for that have proven to be successful for the type of problem or objective desired for the neural network (e.g., input layer 122, hidden layers 124, output layer 126, etc.). In some cases, the one or more neural networks may initiate at a same or similar baseline model, but during the tuning (or training or learning process), the result neural networks can be sufficiently different such that each neural network can be tuned to process a specific type of input and generate a specific type of output with a higher level of accuracy and reliability as compared to a different neural network that is either at the baseline model or tuned or trained for a different objective or purpose. Tuning the neural network can include setting different parameters for each network, fine-tuning parameters differently for each neural network, or assigning different weights (e.g., hyperparameters, or learning rates), tensor flows. Thus, by setting different parameters for each the neural networks based on a tuning or training process and the objective of the neural network, the data processing system can improve performance of the overall path generation process.

Each of the components of the data processing system 110 can be implemented using hardware or a combination of software and hardware. Each component of the data processing system 110 can include logical circuitry (e.g., a central processing unit or CPU) that responds to and processes instructions fetched from a memory unit (e.g., main memory 815 or storage device 825). Each component of the data processing system 110 can include or use a microprocessor or a multi-core processor. A multi-core processor can include two or more processing units on a single computing component. Each component of the data processing system 110 can be based on any of these processors, or any other processor capable of operating as described herein. Each processor can utilize instruction level parallelism, thread level parallelism, different levels of cache, etc. For example, the data processing system 110 can include at least one logic device such as a computing device or server having at least one processor to communicate via the network 101.

The network 101 can include computer networks such as the internet, local, wide, near field communication, metro or other area networks, as well as satellite networks or other computer networks such as voice or data mobile phone communications networks, and combinations thereof. The network 101 can include or constitute an inter-equipment communications network, e.g., a subset of components including the data processing system 110 and components thereof for inter-equipment data transfer. The network 101 can include a point-to-point network, broadcast network, telecommunications network, asynchronous transfer mode network, synchronous optical network, or a synchronous digital hierarchy network, for example. The network 101 can include at least one wireless link such as an infrared channel or satellite band. The topology of the network 101 can include a bus, star, or ring network topology. The network 101 can include mobile telephone or data networks using any protocol or protocols to communicate among equipment or other devices, including advanced mobile protocols, time or code division multiple access protocols, global system for mobile communication protocols, general packet radio services protocols, or universal mobile telecommunication system protocols, and the same types of data can be transmitted via different protocols.

The components and elements of the data processing system 110 can be separate components, a single component, or part of the data processing system 110. For example, the interface 112, input generator 114, model manager 116, equipment controller 118, machine learning engine 120, or data repository 128 (and the other elements of the data processing system 110) can include combinations of hardware and software, such as one or more processors configured to initiate stop commands, initiate motion commands, and transmit or receive timing data, for example.

The data processing system 110 can be remote from the manufacturing equipment 104. The components of the data processing system 110 can be hosted within a cloud, such that the data processing system 110 can fetch some components via the network 101. For example, portions of data illustrated on the data repository 128 can reside on a remote server, such as in a cloud of servers, that maintains the commands 140, the policy 142, or the historical data 144, and can be accessed by the data processing system 110 (e.g., through network 101) at times when the historical data 144 is obtained to generate a prediction or train a neural network. The components of the data processing system 110 can be connected or communicatively coupled to one another. The connection between the various components of the data processing system 110 can be wired or wireless, or any combination thereof. Counterpart systems or components can be hosted on other manufacturing equipment 104 components to enable communication or coordination between components.

The system 100 can include, interface with or otherwise communicate with one or more pieces of manufacturing equipment 104. The manufacturing equipment 104 can be composed of various materials, such as steel, metal, rubber, ABS plastic, aluminum, titanium, carbon fiber, or various other materials for constructing machinery. Manufacturing equipment 104 can include one or more types of machines configured to manufacturing one or more types of products, including, for example, an extruder machine, calendar (e.g., a set of multiple large-diameter rolls that squeeze rubber compound into a thin sheet), a tire-building machine, or robots. The manufacturing equipment 104 can assemble a plurality of splices for manufacturing a tire using one or more parameters. The manufacturing equipment 104 can include one or more components for assembling one or more splices for manufacturing a tire. The components can be labeled as, for example, a first equipment, a second equipment, and a third equipment. Each component of the manufacturing equipment 104 can include one or more splices. The splices can be labeled, for example, as left splice, middle splice, or right splice. The manufacturing equipment 104 can be, for example, a pressure roller. The manufacturing equipment 104 can communicate or provide information to the data processing system 110 via the network 101. The data processing system 110 can provide one or more instructions to the manufacturing equipment 104, which can be based on the information provided.

The system 100 can include, interface, or otherwise communicate with one or more sensors 108. The sensors 108 can be coupled to or associated with a manufacturing equipment 104. The sensors 108 can provide information to the data processing system 110. The data processing system 110 can store the information provided by the sensors 108 in the sensor data structure 130. The data processing system 110 can interface with the sensors 108 via interface 112. The sensors 108 can be part of the manufacturing equipment 104 or remote from the manufacturing equipment 104. The data processing system 110 can collect data from a first one or more sensors that include one or more different types of sensors 108. The first one or more sensors can include, for example, a temperature sensor, proximity sensor, pressure sensor, speed sensor, torque sensor, or distance sensor. The data processing system 110 can collectively extract the manufacturing equipment 104 information from the sensors 108, such as orientation data, pressure data, load/weight data, or proximity data, such as to measure the displacement between each splice.

The disclosed system and methods can provide improved productivity for manufacturing tires by reducing out of tolerance splices. Although the disclosure can sometimes refer to adjusting parameters based on a prediction via a graphical plot, this is by way of illustration and not intended to be limiting in any way. For example, FIGS. 4-5 can illustrate a prediction or delta difference for the splices over a period of time. At least one parameter of the splice can be adjusted based on the value represented in data plot 400 or data plot 500.

The data processing system 110 can include an interface 112. The interface 112 can be designed, configured, constructed, or operational to receive and transmit information. The interface 112 can receive and transmit information using one or more protocols, such as a network protocol. The interface 112 can include a hardware interface, software interface, wired interface, or wireless interface. The interface 112 can facilitate translating or formatting data from one format to another format. For example, the interface 112 can include an application programming interface that includes definitions for communicating between various components, such as software components. The interface 112 can be designed, constructed or operational to communicate with one or more sensors 108 to collect or receive information. The interface 112 can be designed, constructed or operational to communicate with one or more equipment controller 118 to provide commands or instructions to control a manufacturing equipment 104.

The interface 112 can receive one or more values sensed, measured or detected by one or more sensors 108 of one or more pieces of manufacturing equipment 104 in a manufacturing plant. Each piece of the one or more pieces of manufacturing equipment 104 can be distinguished based on a corresponding equipment ID 138. The sensed data received from the one or more sensors 108 can include data detected, obtained, sensed, collected, or otherwise identified by the one or more sensors 108. The sensed data can include, for example, data from one or more sensors 108 such as a speed, torque, pressure, orientation, temperature, weight, density, thickness, length, color, hardness, or other property of a material. For example, the speed data can provide movement information corresponding to the manufacturing equipment 104 performing at least one operation. The torque data can determine the rotational force applied by the manufacturing equipment 104, for example, when rolling the manufacturing equipment 104 to collect the materials. The pressure data can include the pressure applied to the materials for pasting onto the manufacturing equipment 104, for example, the materials can be applied onto a pressure roller (e.g. manufacturing equipment 104) at 100 pounds per square inch (psi). The orientation data can include the orientation of each splice within the manufacturing equipment 104, for example, to align and assemble the splices into a single object, such as a tire. The orientation can include, for example, 0 degrees, 10 degrees, 90 degrees, 180 degrees, and so forth. The temperature data can indicate the temperature of the materials or the manufacturing equipment 104.

The data processing system 110 can include an input generator 114 designed, constructed or operational to generate at least one input for the machine learning engine 120. The input generator 114 can be interconnected with other components of the data processing system 110. The input generator 114 can determine or select one or more metrics based on the one or more values sensed by the one or more sensors 108 via the interface 112. The input generator 114 can access the values from the sensor data structure 130 of the data repository 128. The input generator 114 can further access a plurality of metrics of the metrics data structure 132. The input generator 114 can determine at least one metric from a list of metrics stored in the metrics data structure 132. The metrics can be categorized, such as to associate the values sensed by the sensors 108 with at least one metric from the metrics data structure 132. The metric indicating a function can calculate at least the splice deviation and the slope derivative. The splice deviation can be, for example, a measurement of a data point deviated from a central point. The central point can be a midpoint, which can be a point to determine an ideal or desired splice. The midpoint can be determined or configured by the data processing system 110, based on the policy 142. As illustrated in FIG. 4, the y-axis can indicate the acceptable quality tolerances and the actual measurement of the splice overlap or gap after model prescription of pressure roller settings. The measurement can be in any units, including, for example, centimeters, millimeters, inches, etc. The x-axis can indicate the date and time the splice was measured and recorded. The slope derivative can be, for example, a moving average slope between periods of tolerance measurement to predict out of tolerance splice. For example, the input generator 114 can determine a slope (e.g. slope derivative) of the moving average over a plurality of predetermined periods. The period can refer to a time series to determine the moving average over a plurality of predetermined periods. The period can be set to, for example, 5, 10, 25, or 50-period to group the dataset within the set period for generating the slope. The plurality of predetermined periods can comprise of at least two different predetermined periods. The determined slope can be used to generate at least one matrix for the machine learning engine 120.

The input generator 114 can generate at least one matrix for the machine learning engine 120. The matrix can be based on the one or more values sensed by the sensors 108. The matrix can be further based on the determined or selected metric from the metrics data structure 132 associated with the values sensed by the sensors 108. The matrix can be, for example, a two-dimensional ("2D") or a three-dimensional ("3D") array including or based on the values from the sensors 108 and a corresponding selected metric. The matrix can group, categorize, label, or otherwise organize the data for the machine learning engine 120 to process. The input generator 114 can organize the data in the matrix based on the time stamp stored in the sensors data structure 130. The input generator 114 can retrieve additional information from the historical data structure 144, such as historical sensor values, training sets used to train or tune neural networks, user preferences, tire information/recipe, prior prediction information, or prior parameter adjustments information to provide the machine learning engine 120 for computation. The input generator 114 can further include computed data based on the values of the sensors 108 using the selected metric. The computed data can, for example, expedite at least one preprocessing step of the machine learning engine 120. The input generator 114 can store the generated matrix in the metrics data structure 132. In further example, the data processing system 110 can transfer a previously generated matrix to the historical data structure 144. For example, the input generator 114 can generate a first matrix of a first splice and store the first matrix in the metrics data structure 132. The data processing system 110 can determine, based on an indication of manufacturing a second splice, to transfer the first matrix from the metrics data structure 132 to the historical data 144 to generate a second matrix, which can be based in part on the first matrix stored in the historical data 144.

The data processing system 110 can include a model manager 116 designed, constructed or operational to predict at least one value for adjusting at least one parameter of the manufacturing equipment 104. The prediction value can be provided to a splice tolerance metric stored in the metrics data structure 132. The splice tolerance metric can be a metric for determining a tolerance difference between a splice and an ideal splice. The tolerance of the splice can be associated with the generated matrix stored in the metrics data structure 132. The tolerance of the splice can be identified as a confidence score. The confidence score can be associated with the value for the splice tolerance metric predicted by at least one model from the machine learning engine 120. The matrix can correspond to the values of the sensors 108 and the selected metric from the metrics data structure 132. For example, the matrix can be generated from various information of the previously mentioned splice. The generated matrix can determine a tolerance value of the splice to compare with the ideal splice (e.g. an ideal tolerance value). In some cases, the tolerance of the splice can be associated with the matrix stored in the historical data structure 144. For example, the model manager 116 can utilize the historical matrix from the historical data structure 144 to provide a prediction of one or more forthcoming splices tolerance value. The historical matrix can include, for example, historically collected splice tolerance value corresponding to at least one assembled splice. The ideal splice can refer to a splice with standard values, such as pressure, dimensions, shape, weight, or other aspects of the tires determined to be an expected value. The splice tolerance metric can, for example, determine a delta difference of at least one parameter between the splice and the ideal splice, such as pressure, orientation, or load. The splice tolerance metric can further determine if the splice is in tolerance or out of tolerance. The in or out of tolerance can be a binary determination. The splice tolerance metric can determine a magnitude of which the splice exceed a tolerance level. The tolerance level can refer to a boundary value or a threshold for at least one parameter to determine, for example, if the splice is in tolerance or out of tolerance. The tolerance level can be based on at least one policy from the policy data structure 142.

The model manager 116 can be interconnected with various other components of the data processing system 110. The model manager 116 can communicate with the machine learning engine 120 to manage one or more models generated by the machine learning engine 120. The generated models can be based on the input generator 114 providing or storing one or more information to the data repository 128. The information provided by the input generator 114 can include at least the sensor data 130 or the metric 132, such as to generate the matrix. The machine learning engine 120 can receive at least the information or matrix from the data repository 128, such as from the sensor data structure 130, the metrics data structure 132, or the historical data structure 144. The model manager 116 in communication with the machine learning engine 120 can generate at least one model based on at least one result from the machine learning engine 120. The model can correspond to the manufacturing equipment 104 providing the various information to generate the matrix for the model. The result can be based on various machine learning techniques performed by the machine learning engine 120 using the various information from the data repository 128. The generated model can indicate or provide one or more values for adjustment to the parameters of the manufacturing equipment 104. For example, the data processing system 110 using the model manager 116 can determine to adjust the parameter of at least one manufacturing equipment 104 component responsive to the splice tolerance value (e.g. confidence score) satisfying a threshold value based on at least one policy.

The model manager 116 can receive one or more data from the machine learning engine 120. The model manager 116 can include, for example, a model generation component, or a generator to construct one or more models. The model manager 116 can use the data of the machine learning engine 120 to construct a plurality of models for each component of the manufacturing equipment 104. Each component of the manufacturing equipment 104 can pair with one a plurality of splices of the tire. For example, the component can pair with a left splice, a middle splice, or a right splice. In some cases, the model manager 116 can generate a model corresponding to one of the plurality of models stored in the model data structure 134. The model manager 116 can decide to, for example, merge the generated model with one of the plurality of model. The model manager 116 can further decide to replace one of the plurality of model with the generated model. The model manager 116 can further decide to store the generated model without merging or replacing the preexisting model in the model data structure 134.

The model manager 116 can store one or more generated models in the model data structure 134. The one or more prediction values of the parameter from the generated model can be stored in the collected data structure 136. The prediction values can correspond to a number of splices within a timeframe. For example, the model can provide the prediction values for forthcoming 20 splices to adjust the parameter of the manufacturing equipment 104. The prediction values, for example, can be provided to the equipment controller 118 for adjusting a corresponding manufacturing equipment 104 parameters. The model manager 116 can categorize or organize the generated models based on at least a manufacturing equipment 104 components or a splice type associated with the models. For example, the manufacturing equipment 104 components can include 3 parts labelled a first equipment, a second equipment, and a third equipment. Each of the manufacturing equipment 104 components can include, for example, 3 splices labelled left splice, middle splice, and right splice. The manufacturing equipment 104 components of 3 and the 3 splices associated with each component are provided as an example and not as a limitation to this technology. As such, and in further example, the system 100 can include various number of manufacturing equipment 104 components and splices, such as 2, 5, 10, or 15 components or splices.

The model manager 116 can refresh, update, or otherwise train at least one model stored in the model data structure 134. The model manager 116 can train the model responsive to receiving additional or new values from the sensors 108 corresponding to the manufacturing equipment 104. For example, the model manager 116 can generate a first model for a first splice of a first type associated with a first manufacturing equipment 104 component. The model manager 116 can then receive a matrix for a second splice of the first types associated with the first manufacturing equipment 104 component. The model manager 116 can determine to refresh, update, or otherwise train the existing model corresponding to the first type splice and the first manufacturing equipment 104 component. The updated model can provide additional or adjust the prediction values based on an updated prediction.

The model manager 116 can construct a first model of the plurality of models stored in the model data structure 134 for a first equipment of the one or more pieces of manufacturing equipment 104 and a first splice of the tire. The equipment of the one or more pieces of manufacturing equipment 104 can be referred to as a pressure roller component. The model manager 116 can construct a second model of the plurality of models for the first equipment and a second splice of the tire. The model manager 116 can construct a third model of the plurality of models for the first equipment and a third splice of the tire. The first splice, the second splice, and the third splice can be referred to as a left splice, a middle splice, and a right splice, respectively. The model manager 116 can construct a fourth model of the plurality of models for the second equipment and the first splice of the tire. The model manager 116 can construct a fifth model of the plurality of models for the second equipment and the second splice of the tire. The model manager 116 can construct a sixth model of the plurality of models for the second equipment and the third splice of the tire. The model manager 116 can construct a seventh model of the plurality of models for a third equipment and the first splice of the tire. The model manager 116 can construct an eighth model of the plurality of models for the third equipment and the second splice of the tire. The model manager 116 can construct a ninth model of the plurality of models for the third equipment and the third splice of the tire.

The data processing system 110 can include an equipment controller 118 designed, constructed or operational to configure, maneuver, or otherwise instruct the manufacturing equipment 104 via the network 101. The equipment controller 118 can instruct the manufacturing equipment 104 to perform one or more operation, such as initiate, pause, continue, or stop the operation. The equipment controller 118 can configure one or more parameters of the manufacturing equipment 104, such as maneuvering speed, orientation, timing, pressure, alignment, and/or other operations compatible with the manufacturing equipment 104.

The equipment controller 118 can be interconnected with other components of the data processing system 110. The equipment controller 118 can access various data structure in the data repository 128, such as the collected data 136, the equipment ID 138, or the commands 140. The collected data 136 can include one or more prediction values based on the model generated by the model manager 116 in communication with the machine learning engine 120. The equipment ID 138 can represent, for example, a routing ID associated with a manufacturing equipment 104 to provide one or more instructions. The equipment ID 138 can further represent the component of the manufacturing equipment 104 to provide the instructions. The commands 140 can include the instructions for providing to the manufacturing equipment 104 or the component of the manufacturing equipment 104.

The data processing system 110 can include a machine learning engine 120 designed, constructed and operational to process status information associated with one or more manufacturing equipment 104 to generate, identify, determine or assign one or more commands 140 to the manufacturing equipment 104. The commands can be further linked, provided, or transferred to a component of the manufacturing equipment 104. The component of the manufacturing equipment 104 can be referred to as a target component. The data processing system 110 can input, into the machine learning engine 120, the information of the target component. The machine learning engine 120 can include or utilize a neural network (e.g., neural network 600 depicted in FIG. 6) having an input layer 122, one or more hidden layers 124, and an output layer 126.

The machine learning engine 120 can train one or more models stored in the model data structure 134 based on, for example, a degree to which splices, prior to manufacturing the splices into a tire, deviate from a predetermine splice point. The deviation can refer to a delta difference between the tolerance of the splice and an ideal tolerance value corresponding to the splices. The degree of tolerance can refer to various parameters, such as temperature, pressure, orientation, or position of the tire during manufacturing or assembly process. The machine learning engine 120 can further train the one or more models based on at least one result of the previous splice. The result of the previous splice can include at least a moving average of a splice point for a predetermined number of periods. The result can further include a slope derivative of a predetermined number of moving averages of the splice point. The result can be from one or more components of the manufacturing equipment 104 with or without the adjusted parameters, as can be seen in FIG. 4 and FIG. 5.

The machine learning engine 120 can include a neural network, machine learning technique, or base model. For example, the machine learning engine 120 can include a convolution neural network. The machine learning engine 120 can include any type of neural network including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, etc.

The machine learning engine 120 can maintain, manage, store, update, tune, or configure the one or more neural networks. The machine learning engine 120 can use different parameters, weights, training sets, or configurations for the neural network or the one or more hidden layers 124 to allow the neural networks to efficiently and accurately process a type of input (or intermediary input) and generate a type of output (or intermediary output). By configuring and tuning the neural network or each hidden intermediary layer thereof, the data processing system 110 can improve the efficiency, reliability and accuracy with which splice tolerance is predicted, relative to not using a neural network or not using a neural network that has been trained or configured to process manufacturing equipment 104 information.

For example, the machine learning engine 120 can be configured as or include a convolution neural network. The convolution neural network can include one or more convolution cells (or pooling layers) and kernels, that can each serve a different purpose. The input layer 122 can include a convolution kernel that can process input data, and the pooling layers can simplify the data, using, for example, non-linear functions such as a max, thereby reducing unnecessary features. The manufacturing equipment 104 information can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other classification algorithms, the convolution neural network can automatically learn the filters that may be hand-engineered for other classification algorithms, thereby improving the efficiency associated with configuring, establishing or setting up the neural network, thereby providing a technical advantage relative to other classification techniques.

The deep learning engine can use a neural network such as a convolution neural network designed and constructed to have an input layer 122 and an output layer 126. The neural network can have one or more hidden layers 124 that can include convolution layers, pooling layers, fully connected layers, or normalization layers. For example, in a convolution layers, the data processing system 110 can apply a convolution operation to the input, passing the result to the next layer. The convolution can emulate the response of an individual neuron to visual stimuli. Each convolutional neuron processes data only for its receptive field. Using the convolution operation can reduce the number of neurons used in the neural network as compared to a fully connected feedforward neural network. Thus, the convolution operation brings a technical solution to this problem as it reduces the number of free parameters, allowing the network to be deeper with fewer parameters. In at least this way, the machine learning engine 120 with a convolution neural network can resolve the vanishing or exploding gradients problem in training traditional multi-layer neural networks with many layers by using backpropagation.

The machine learning engine 120 configured with a convolution neural network can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The machine learning engine 120 configured with a convolution neural network can include connected layers. Connected layers can connect neurons in one layer to neurons in another layer. The machine learning engine 120 configured with a convolution neural network can be configured with shared weights in convolutional layers, which can refer to the same filter being used for each receptive field in the layer, thereby reducing a memory footprint and improving performance of the neural network.

The hidden layers 124 in the convolution neural network can include filters that are tuned or configured to detect information based on the manufacturing equipment 104 information received at the input layer 122. As the data processing system 110 steps through each layer in the convolution neural network, the data processing system 110 can translate the input from a first layer and output the transformed input to a second layer, and so on. The convolution neural network can include one or more hidden layers 124 based on the type of object or information being detected and the type of input manufacturing equipment 104 information.

The data processing system 110 can train the neural network of the machine learning engine 120 using at least sensor data 130, metrics 132, or historical data 144. The neural network can be trained on one or more servers of the data processing system 110 or remote from the data processing system 110. The neural network of the machine learning engine 120 can be trained to process, analyze, or use splice information, such as the parameter and tolerance information from the target component to predict one or more values for parameter adjustment in order to provide one or more commands 140 to control the target component to reduce non-operation time of the manufacturing equipment 104.

The data processing system 110 can assign, based on an output from the machine learning engine 120, a prediction value (e.g., collected data 136 stored in data repository 128) to the manufacturing equipment 104. The data processing system 110, using the machine learning engine 120, can adjust the parameter value of the equipment controller 118 to provide the manufacturing equipment 104, for example. The data processing system 110 can output, via output layer 126 of the machine learning engine 120, the prediction value to assign to the target component, or one or more other components of the manufacturing equipment 104. To do so, the data processing system 110 can input various splice information (e.g., pressure, orientation, dimensions, temperature) for the target component into the input layer 122 of the neural network. The data processing system 110 (e.g., via machine learning engine 120) can analyze this information to assign a prediction value to the target component. For example, if the tolerance of the splice is less than a tolerance level, based on at least one policy 142, the data processing system 110 can determine, using the machine learning engine 120, to provide a prediction value for adjusting the parameter of the target component to reduce out of tolerance splice. The parameter value to adjust the target component to correct the splice tolerance can include at least a pressure, orientation, alignment, or position value of the target component associated to a type of splice. The type of splice can include the left splice, the middle splice, or the right splice. However, if the splice is within a tolerance range based on at least one policy 142 (e.g. low delta difference from the midpoint of an ideal splice) the data processing system 110 can determine, using the machine learning engine 120, not to provide an adjustment value for the parameter. Instead, the data processing system 110 can determine to refresh, update, or train the model 134 to further increase range of prediction. For example, the model can predict the tolerance level for 20 forthcoming splices, and by updating the model with at least one splice information, the updated model can predict the tolerance level for 25, 30, or 40 forthcoming splices.

The second neural network can be maintained by the machine learning engine 120. The second neural network can include one or more component or functionality of the neural network 600 depicted in FIG. 6. The second neural network can be a same type of neural network as the neural network 600, such as a convolution neural network. The second neural network can generate prediction values to adjust the manufacturing equipment 104 parameter. For example, the manufacturing equipment 104 can provide various information of each component using the sensors 108, and the data processing system 110 can input the information of each of the plurality of components into the machine learning engine 120 to assign a value to each of the plurality of component, and indicate one or more commands 140 to at least one component of the plurality of components to change the parameter for reduction in out of tolerance splice.

As the data processing system 110 receives updated status information for the one or more components of the manufacturing equipment 104, the data processing system 110 can generate an updated model for the manufacturing equipment 104 based on the historical data 144 and the updated parameter value, the sensed values from the sensors 108, or any subsequent parameter values. The data processing system 110 can continually update or regenerate models for the manufacturing equipment 104 as updated information is received from, for example, the sensors 108 or each component of the manufacturing equipment 104 associated with each splice. Thus, the data processing system 110 can continually or periodically update the model for the manufacturing equipment 104 based on the historical data 144, the current receiving sensors 108 information, and parameters value.

Figure 2:
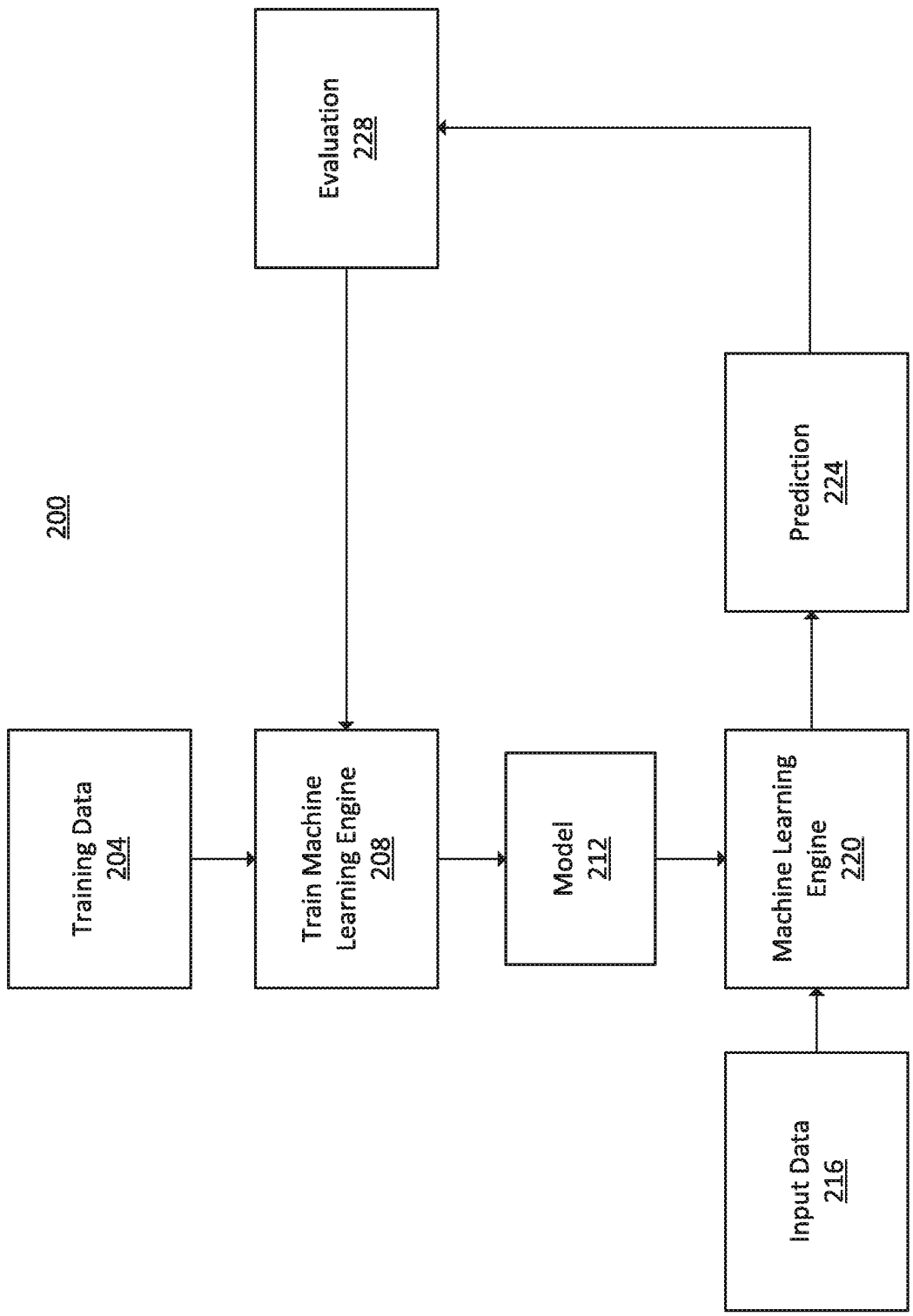
FIG. 2 depicts an example operational diagram of machine learning engine for predictive analytics process, in accordance with an embodiment.

FIG. 2 depicts an example operational diagram of machine learning engine for predictive analytics process, in accordance with an embodiment. The operation 200 can be performed by one or more system, component or function depicted in FIG. 1 and FIG. 8. For example, the operation can be performed by a data processing system, manufacturing equipment, sensors, interface, input generator, model manager, equipment controller, machine learning engine, or data repository. At ACT 204, the data processing system can receive, identify or collect training data to train at least one model from the machine learning engine. The training data can be from at least a remote server, historical data, sensor data, or other database containing various information on the current or past splices. The training data can include, for example, production data, pressure parameters data, tire construction data, or historical splices data. The training data can further include child component production data, and lot trace data. The child component production data can refer to each component of the manufacturing equipment. The training data can correspond to each child component. For example, the training data can correspond to a left splice of a first equipment of the manufacturing equipment and a different training data can correspond to a right splice of a second equipment of the manufacturing equipment. The lot trance data can include information of the materials for producing a splice. The lot trace data can include, for example, at least one material, structure, dimensions, or texture for producing a splice.

At ACT 208, the data processing system can pass the training data at ACT 204 to the machine learning engine for training. The machine learning engine can perform one or more machine learning techniques using the training data, as described in greater details in FIG. 1. The machine learning engine can receive one or more training data via the interface of the data processing system. The machine learning engine can generate or update at least one model based on the training data. The model can be stored in the model data structure.

At ACT 212, the data processing system can pass the generated model to the machine learning engine to perform additional machine learning technique. At ACT 216, the data processing system can pass an input data to the machine learning engine. The input data can represent various sensor data and a selected metric based on the sensor data. The input data can further represent information corresponding to, for example, a current splice or a past manufactured splice. The sensor data and the selected metric can be used to generate a matrix for input to the machine learning engine.

At ACT 220, the data processing system can pass both the input data and the model to the machine learning engine. The machine learning engine can merge the input data and the model to update the model for predicting the parameter adjustment value. At ACT 224, the data processing system can predict a parameter adjustment value. The parameter adjustment value can be based on the updated model from ACT 220. The prediction can be stored in the collected data within the data repository. The data processing system can provide at least one command to the manufacturing equipment based on the prediction value. The prediction value can include, for example, pressure, orientation, or alignment for the splice to current out of tolerance splices.

At ACT 228, the data processing system can perform a determination or evaluation of the splices, based on the adjustment to the parameter of a component corresponding to the splice. For example, the data processing system can determine that the splice is within tolerance range, subsequent to the change in the parameter of the component. The tolerance range can refer to, for example, at least one delta difference from the midpoint. Based on the in tolerance splice, the data processing system can decide to further adjust the parameters of the manufacturing equipment. In further example, the data processing system can determine that the splice is out of tolerance based on the parameter adjustment. The data processing system can decide to train and update the model for re-evaluation. The operation 200 can be repeated in cycle, for example, sequentially from ACT 208, ACT 212, ACT 220, ACT, 224, and ACT 228. The training data of ACT 204 and input data of ACT 216 can be provided to the operation 200 cycle to train the model based on receiving one or more information corresponding to the current or historical splice.

Figure 3:
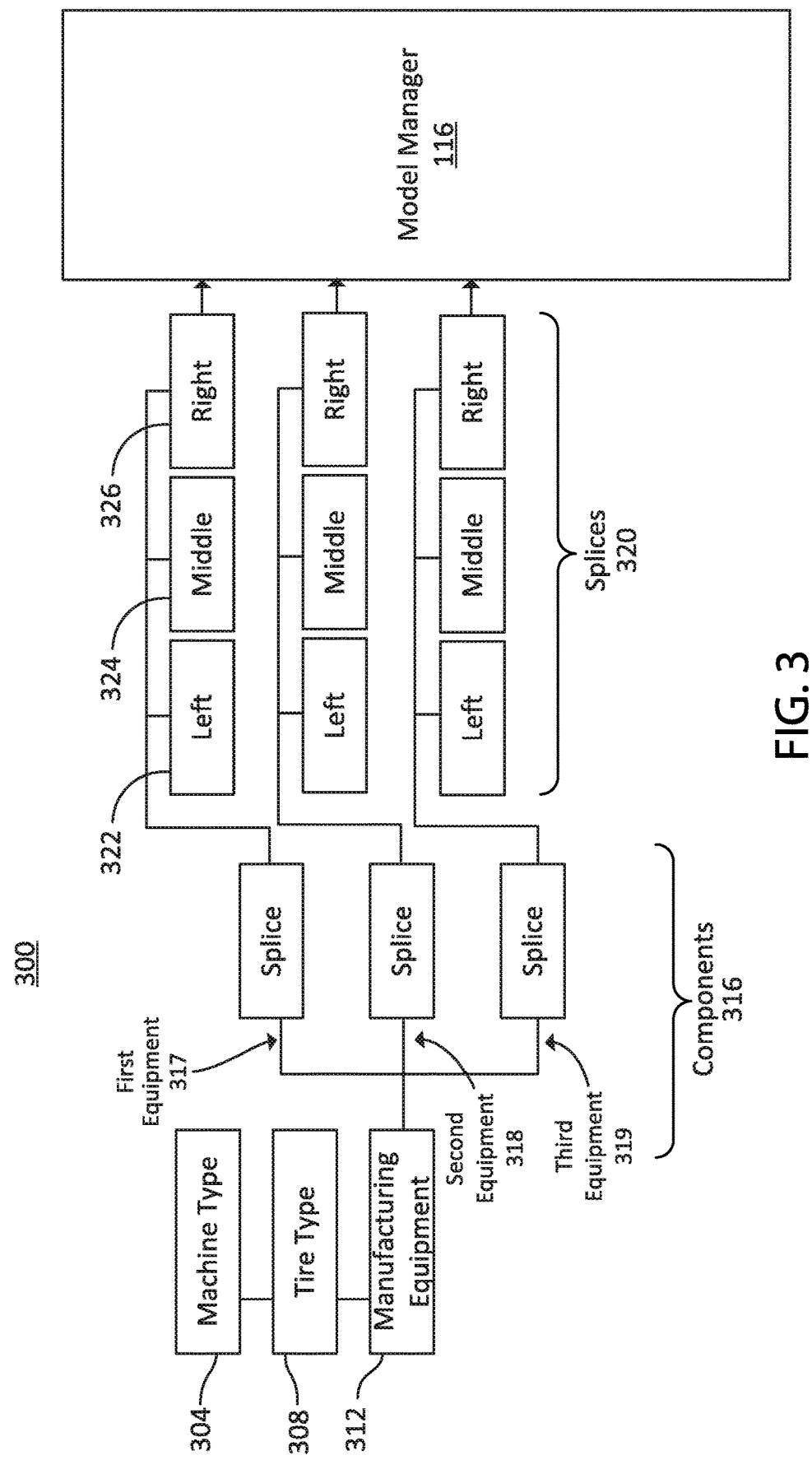
FIG. 3 depicts an example operational diagram of analytics data hierarchy for managing models for the machine learning engine, in accordance with an embodiment.

FIG. 3 depicts an example operational diagram of analytics data hierarchy for managing models for the machine learning engine, in accordance with an embodiment. The operation 300 performed by one or more system, component or function depicted in FIG. 1 and FIG. 8. For example, the operation can be performed by a data processing system, manufacturing equipment, sensors, interface, input generator, model manager, equipment controller, machine learning engine, or data repository. The operation 300 can demonstrate generation of various models for predicting parameter adjustment. The operation 300 can include various components of a data hierarchy for manufacturing tires, such as a machine type 304, tire types 308, manufacturing equipment 312, components 316, and splices 320. The manufacturing equipment 312 can refer to the manufacturing equipment 104 of FIG. 1. The data processing system can determine the machine type 304 based on a make, model, or other equipment ID associated with the tire manufacturing machine.

The data processing system can determine tire types 308 of the machine type 304 to receive at least one lot trace data. The tire types 308 can be based on a compatibility with one or more types of vehicle. For example, the tire types 308 can be for a sedan, minivan, truck, SUV, or other types of vehicle. The tire types 308 be based on the dimensions and thickness of the material. The data processing system can determine the manufacturing equipment 312 for adjusting the one or more parameters to create or produce the tire type 308. The data processing system can pass an indication of the tire type 308 to at least one manufacturing equipment 312 to create or produce a corresponding tire of the tire type 308 using one or more splices 320.

The data processing system can identify each manufacturing equipment 312 from the plurality of manufacturing equipment 312 based on an equipment ID. The plurality of manufacturing equipment 312 can be one of a tire manufacturing machine, such as VMI Maxx or other related tire building machines ("TBM"). The machine type 304 can determine various associated operational capabilities and parameters. The data processing system can further use the equipment ID to identify each component of the plurality of components 316 to adjust one or more parameters. The manufacturing equipment 312 can include various components 316 corresponding to each of the plurality of manufacturing equipment 312. The components 316 of the manufacturing equipment can include at least a first equipment 317, a second equipment 318, and a third equipment 319, for example. Each component can refer to a portion of the manufacturing equipment 312 for manufacturing a tire. Each component can include corresponding splices 320 for manufacturing a tire. The splices 320 can be identified using the equipment ID, similar to identifying the components 316 of the manufacturing equipment 312. The splices can include various splice types, such as a left splice 322, a middle splice 324, or a right splice 326. The splices 320 can correspond to each of the component 316, for example, the first equipment 317 can include a first left splice 322, a first middle splice 324, and a first right splice 326, the second equipment 318 can include a second left splice 322, a second middle splice 324, and a second right splice 326, and the third equipment 319 can follow include splices 320 corresponding to the third equipment 319. The data processing system can receive one or more values corresponding to at least one splice 320 of the component 316. The values can be used along with at least one metric to generate a matrix for a machine learning engine. The machine learning engine can generate or update the model corresponding to each slice of each component of the manufacturing equipment. The model can be provided to the model manager 116, for example, to organize, categorized, group or otherwise arrange the models based on the corresponding splice type for parameter adjustment.

Additionally, the operation 300 can perform the steps as described herein. The data processing system can identify a machine type 304 for manufacturing a tire to collect one or more manufacturing equipment 312 information. The data processing system can further identify a tire type 308 of the tire to manufacture. The data processing system can select at least one of the manufacturing equipment 312 from the plurality of manufacturing equipment 312 corresponding to manufacturing the tire of the tire type 308. The data processing system can further select one of the components 316, such as the first equipment 317, the second equipment 318, or the third equipment 319 for information collection. The data processing system can collect information from the selected component 316 for adjusting at least one parameter corresponding to at least one of the splices 320, such as the left splice 322, the middle splice 324, or the right splice 326. The data processing system can provide the collected information to the model manager 116 for updating, generating, or managing the models.

FIG. 4 depicts an example illustration of splice deviation from the mid-point/centerline, in accordance with an embodiment. FIG. 4 depicts a data plot 400 that can be generated by one or more systems, components, or functions depicted in FIG. 1, 2, 3 or 7, including, for example, by a data processing system, manufacturing equipment, sensors, interface, input generator, model manager, equipment controller, machine learning engine, or data repository. The data plot 400 depicts a midpoint 410, splice deviation 415 (e.g., data set 415), and out of tolerance range 420. The midpoint 410 can refer to an ideal point or centerline, such as an expected value point for a splice under ideal condition or parameters. The out of tolerance range 420 portion of the data plot 400 can refer to a range in which a splice is considered out of tolerance, such that the splice exceeds one or more policies. Considering the splice deviation 415, a plurality of points on the data plot 400 can be noted as out of tolerance. For example, at approximately time 85, 529, and 829, the splice at the given time deviated beyond (e.g., past) the tolerance range. The splice passing the tolerance range can be considered as out of tolerance. Rather than measuring binary in or out of tolerance, the data plot 400 demonstrates a degree measurement to which the splice deviated from the ideal midpoint. The deviation can be based on at least one metric stored in the metric data structure. The data plot 400 can be a graphical example of the machine learning engine analysis on a plurality of values and metrics to generate one or more models.

FIG. 5 depicts an example illustration of slope derivatives for splice deviation 415, in accordance with an embodiment. FIG. 5 depicts a data plot 500 that can be generated by one or more systems, components, or functions depicted in FIG. 1, 2, 3 or 7, including, for example, by a data processing system, manufacturing equipment, sensors, interface, input generator, model manager, equipment controller, machine learning engine, or data repository. The data plot 500 can include a description similar to the data plot 400. The data plot 500, similar to data plot 400, can perform at least one slope function, such as slope derivative, to compute a slope based on at least a period moving averages. For example, a first data set 425 on the data plot 500 can represent a slope derivative using 20 period moving average for predicting out of tolerance splice. A second data set 430 on the data plot 500 may represent a slope derivative using 50 period moving average for predicting out of tolerance splice. Using at least the moving average function and the corresponding slopes, the data processing system can provide an observation in the data plot 500 momentum, to predict at least a time, a splice, a batch, or a number of splice that may be out of tolerance based on the previous parameter.

Figure 6:
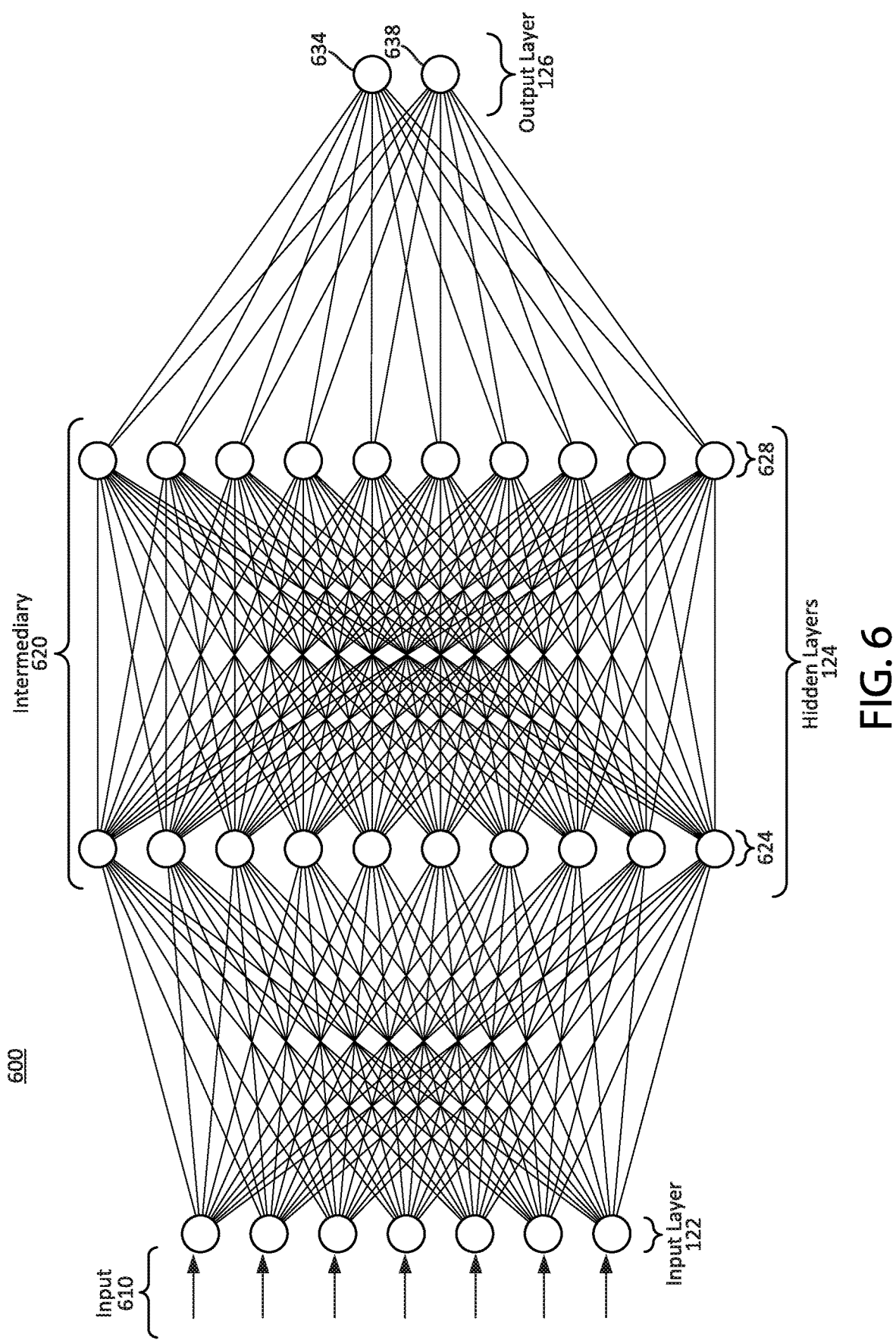
FIG. 6 depicts an example of neural network used by a machine learning engine to predict out of tolerance splice and determine the parameter of a manufacturing equipment, in accordance with an implementation.

FIG. 6 depicts an example of neural network used by a machine learning engine to predict out of tolerance splice and determine the parameter of a manufacturing equipment, in accordance with an implementation. FIG. 6 depicts an example operation of a neural network used by a machine learning engine to adjust one or more parameters of the manufacturing equipment via an interface interconnected to a network. The operation may be performed by one or more systems, components, or functions depicted in FIG. 1, FIG. 2, FIG. 3, FIG. 7, or FIG. 8. For example, the operation can be performed by or via a data processing system, manufacturing equipment, sensors, interface, input generator, model manager, equipment controller, machine learning engine, or data repository.

At ACT 610, the data processing system can input various information from sensors of the manufacturing equipment at the input layer 122 of the neural network 600. The various information from the sensors 108 can be described in further details in FIG. 1. The data processing system can further input at least one selected metric corresponding to the information sensed by the sensors 108. The data processing system 110 can use the input generator 114 to generate a matrix corresponding to the sensors information (e.g. one or more values) and the selected metric. The generated matrix can categorize the sensors information using the metric, such as for filtering the data to provide the machine learning engine. The data processing system can input the matrix at the input layer 122.

Subsequent to input at ACT 610, the data processing system can pass the input information to shared convolution layers of the neural network 600. The input layer 122 can be trained, configured or operational to receive, as input, at least the sensor data, metrics, or historical data, and output data to the hidden layers 124. The neural network can include multiple hidden layers, such as a first hidden layer 624 and a second hidden layer 628. The neural network can further include a third hidden intermediary layer (not shown) and a fourth hidden intermediary layer (not shown). The neural network can include an output layer 126.

The hidden layers 124 can be convolution layers, pooling layers, fully connected layers, or weighted layers. Each node in the layer can perform a process or operation on the data. Each node or layer can transform an input data to generate an output data (e.g., an intermediate output that can be passed to a subsequent layer, or a final output passed to another component in the system).

For example, the first input layer 122 can receive the manufacturing equipment information data, process the data to transform the data to a first intermediate output, and forward the first intermediate output to a first hidden layer 624. The first hidden layer 624 can receive the first intermediate output, process the first intermediate output to transform the first intermediate output to a second intermediate output, and forward the second intermediate output to a second hidden layer 628. The second hidden layer 628 can receive the second intermediate output, process the second intermediate output to transform the second intermediate output to a third intermediate output, and forward the third intermediate output to a third hidden intermediary layer (not shown). The third hidden intermediary layer can receive the third intermediate output, process the third intermediate output to transform the third intermediate output to a fourth intermediate output, and forward the fourth intermediate output to a fourth hidden intermediary layer (not shown). The fourth hidden intermediary layer can receive the fourth intermediate output, process the fourth intermediate output to transform the fourth intermediate output to a fifth intermediate output, and forward the fifth intermediate output to an output layer 126. The output layer 126 can receive the fifth intermediate output, process the fifth intermediate output to transform the fifth intermediate output to a final output, and forward the final output. The final output prediction can include in tolerance prediction 634 and out of tolerance prediction 638. The output prediction (e.g., in tolerance prediction 634, out of tolerance prediction 638, etc.) can correspond to, for example, a pressure level, thickness level, position, or orientation of a splice corresponding to the input. For example, the final output can provide an out of tolerance prediction 638 with at least one value for parameter adjustment. The final output can further provide an in tolerance prediction 634 to at least maintain the parameter of the manufacturing equipment or a model generated by the output layer 126. The output prediction can be used for generating or updating at least one model corresponding to a component of the manufacturing equipment. Thus, the neural network 600 can be configured, trained, tuned or operational to receive manufacturing equipment information and output predictions using a convolution neural network having one or more hidden layers.

Figure 7:
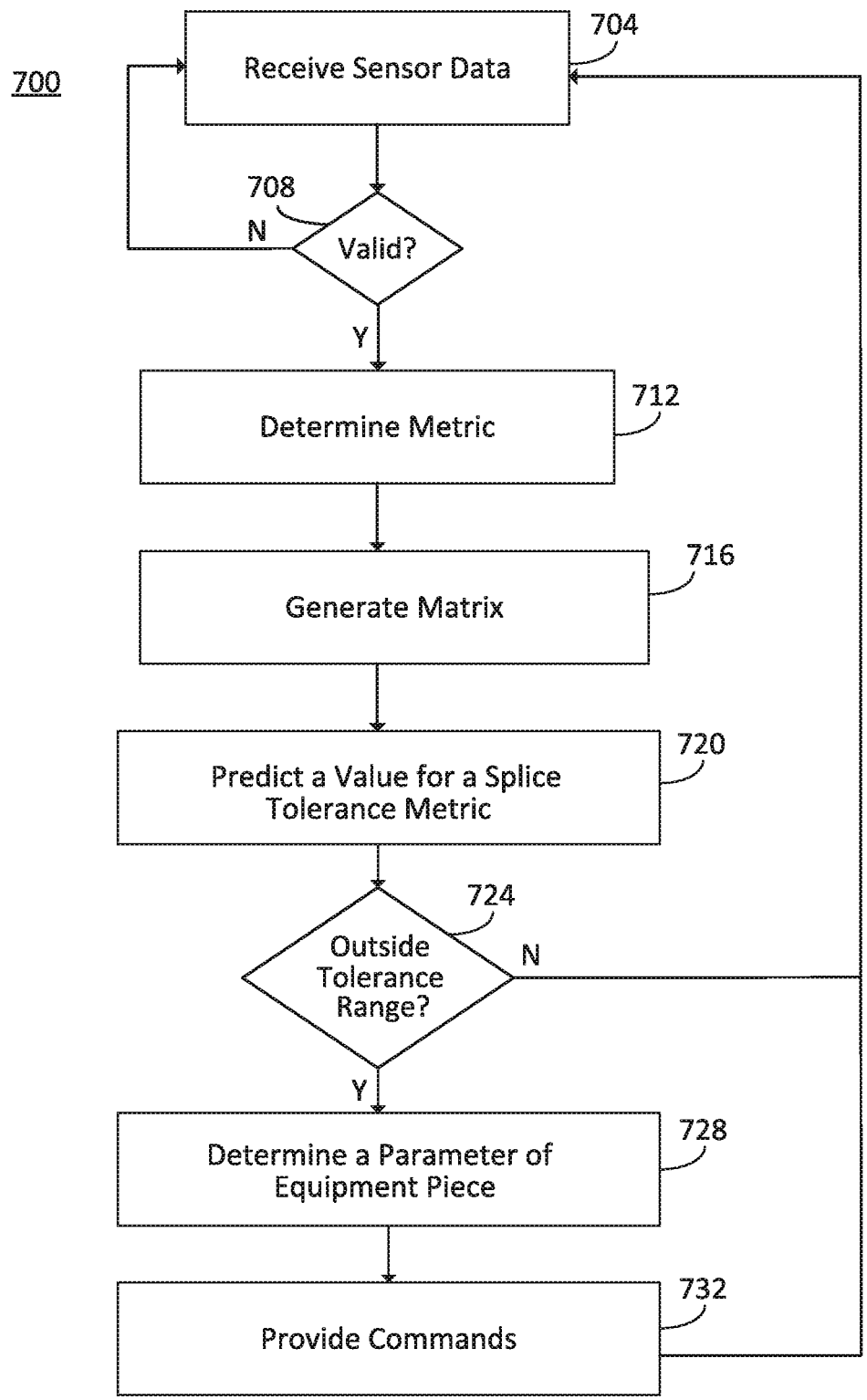
FIG. 7 is a flow diagram depicting an example method for manufacturing a tire, in accordance with an implementation.

FIG. 7 depicts a flow diagram depicting an example method for manufacturing a tire, in accordance with an implementation. The method 700 can be performed by one or more systems, components, or functions depicted in FIG. 1-6 or 8, including, for example, by a data processing system, manufacturing equipment, sensors, interface, input generator, model manager, equipment controller, machine learning engine, or data repository. At ACT 704, the data processing system may receive sensor data. The data processing system can receive data sensed by one or more sensors of each manufacturing equipment component. The data processing system can receive sensor data periodically, continuously, responsive to a request, responsive to an event or trigger. The data processing system can receive sensor data from one or more sensors. The data processing system can detect a change in a characteristic or measurement associated with a sensor, and then request updated information from the specific sensor that detected the change. The data processing system can request data from all sensors. The data processing system can request data from a subset of sensors based on the type of operation being performed by the data processing system, thereby reducing sensor computing resource utilization, processor utilization, memory utilization, or I/O utilization. For example, the data processing system may have access to a temperature sensor, proximity sensor, pressure sensor, speed sensor, torque sensor, or distance sensor. The data processing system can decide to use a single sensor, such as a pressure sensor to, for example, determine a splice tolerance level of each splice. In the example, the pressure information can be provided to generate an input for the machine learning engine for predicting at least one parameter value.

At ACT 708, the data processing system can determine that the data from the one or more sensors is insufficient for input into the machine learning engine for generating a model or prediction. In some embodiments, the data processing system determines whether or not the data received by the interface 112 from the sensors 108 is valid. For example, the collected sensor data may not have sufficient resolution, granularity, or sampling rate (e.g., the sampling rate may be below a value based on at least one policy). The collected sensor data may have a low signal-to-noise ratio (e.g., less than a value on the policy). The collected sensor data may have a high amount of artifacts or noise (e.g., greater than a value based on the policy). The policy can determine not to accept or store sensor data based on the noise exceeding a certain value to, for example, prevent generating an invalid or inaccurate models for predicting a parameter adjustment value. The collected sensor data may have erroneous readings (e.g., range measurements that are greater than a value set for the predicting a parameter value). A sensor may indicate a malfunction or fault during the collected sensor data. The data processing system can receive a second sensor data by, for example, going back to ACT 704, based on determining at least the validity of the data or the data sufficiency. The sufficiency can refer to the amount of data obtained by the sensor 108 for accurate depiction of the splice. In a second embodiment, the data processing system can determine that the received data is valid. The valid data from the sensors 108 can be stored in the sensors data structure.

At ACT 712, the data processing system can determine a receipt of at least one new or additional sensor information corresponding to a manufacturing equipment component. The data processing system can determine the type of data received by the sensor 108, for example, a temperature data, proximity data, pressure data, or distance data. The data processing system can select, using the input generator, at least one metric stored in the metric data structure based on the value or type of the sensor data. The metric can include a plurality of functions for categorizing or organizing the data used for determining the tolerance of each splice corresponding to the manufacturing equipment component.

At ACT 716, the data processing system can utilize the input generator 114 to generate a matrix for input to the machine learning engine. The matrix can be based on the collected sensor data and the determined metric, as in ACT 704 and ACT 712. The matrix can include confusion matrix, accuracy matrix, precision matrix, sensitivity matrix, specificity matrix, or other related matrix for input to the machine learning engine, as described in FIG. 1. The data processing system can store the matrix in the metrics data structure alongside one or more metrics. In some cases, the matrix stored in the metrics data structure can be removed from the data repository or transferred to at least a historical data structure or a remote data repository. The matrix can be removed or transferred to, for example, reallocate one or more memory spaces within the data repository 128. The matrix can be further removed or transferred based on the machine learning receiving the matrix for generating a model.

At ACT 720, the data processing system can predict a value for a splice tolerance metric. The data processing system can predict the value for at least one parameter for adjustment. The prediction value can be stored in a collected data structure. The data processing system can input the generated matrix from the input generator to the machine learning engine at an input layer. The machine learning engine can perform various machine learning techniques to generate or update at least one model corresponding to the manufacturing equipment component and a splice type. The model manager can organize, categorize, or otherwise manage a plurality of models generated by the machine learning engine to store in a model data structure. The model manager can organize or categorize the models as, for example, a left type, a middle type, or a right type corresponding to each of a first equipment, a second equipment, or a third equipment. The model data structure can be maintained, updated, or accessed by the model manager. In some cases, the data processing system can provide a new or additional matrix associated with the manufacturing equipment component and the splice type to the machine learning engine. The model manager can determine the existence of a model with the associated manufacturing equipment component and the splice type. The model manager can provide the model for the machine learning engine to update the model based on the new or additional matrix.

In some cases, the machine learning engine can generate a new model for the model manager. The model manager can decide, based on a duplicate manufacturing equipment component or splice type associated with the model, to merge the new model with the preexisting model, replace the preexisting model, or store the duplicate model in the model data structure. The splice tolerance metric can provide an indication of a delta different between the tolerance of a splice and the ideal tolerance of each splice, as described in FIG. 1. In another cases, the machine learning engine can further use at least one historical data for generating the model. The historical data can also include dataset corresponding the manufacturing equipment component or the splice type.

At ACT 724, the data processing system can determine if the splice is out of tolerance. In some embodiments, the data processing system determines whether or not the splice deviation 415 is within the out of tolerance range 420. The splice tolerance and the out of tolerance range 420 can be determined by the generated model from the machine learning engine. The data processing system can determine if the splice is out of tolerance (e.g., in the out of tolerance range 420) based on at least a delta difference between the splice tolerance and an ideal tolerance of the splice corresponding to the manufacturing equipment component or the splice type. The out of tolerance range 420 can be further based on the delta exceeding a certain value in a tolerance level range, as depicted in FIG. 4 and FIG. 5. The tolerance level range or the accepted tolerance can be based on at least one policy stored in the policy data structure. The data processing system can determine to proceed to ACT 728 for an out of tolerance splice (e.g., if the splice deviation 415 lies within the out of tolerance range 420) or to ACT 704 for an in tolerance splice.

At ACT 728, the data processing system can determine a parameter of at least one piece of equipment in the tire manufacturing plant to adjust. The one piece of equipment can refer to the manufacturing equipment component, such as the first equipment, the second equipment, or the third equipment. Each equipment can include various types of splice, for example, a left splice, a middle splice, or a right splice. The parameter for adjustment can include at least a pressure level, orientation, or position of the splices. The parameter can be based on the prediction value from the spice tolerance metric.

At ACT 732, the data processing system can provide at least one command to adjust the at least one piece of equipment in the tire manufacturing plant based on the prediction value from the splice tolerance metric. The data processing system can utilize the equipment controller 118 to provide the command to the manufacturing equipment component based on the determination of an out of tolerance splice. The equipment controller 118 can determine the manufacturing equipment component to provide the command based on the equipment ID. The equipment ID can include, for example, the routing address associated with at least the sensor 108 or the manufacturing equipment 104. The commands can include, for example, adjusting the pressure value, the orientation, or the position of the splice for manufacturing a tire. The data processing system can further determine the tolerance of the splice based on the parameter adjustment. The result or value corresponding to the splice with the adjusted parameter can be provided to the historical data structure.

Referring back to ACT 704, the data processing system can determine to receive additional sensor data. The determination to receive additional sensor data can be based on at least ACT 724 or ACT 732. For example, the data processing system can determine that the prediction value of the splice tolerance metric is in tolerance. The data processing system, based on the in tolerance prediction of the splice, can maintain the parameter of the manufacturing equipment component by not providing the commands to the component. Instead, the data processing system can wait for additional sensor data responsive to detecting a new splice from the component. In additional example, the data processing system of ACT 732 provides one or more command to at least one manufacturing equipment component to change at least one parameter, such as the pressure, orientation, alignment, or calibration of the component. The data processing system can responsively receive one or more values of the sensors 108 corresponding to the component with adjusted parameter. The values can be checked for validity at ACT 708.

Referring back to ACT 708, the data processing system can check the validity of the sensor data of ACT 704 based on, for example, the splice being in tolerance range or an adjustment to one or more parameter corresponding to an out of tolerance splice. The data processing system can determine to update or generate a matrix at ACT 716, based on at least the determination that the sensor data is valid or the one or more values received subsequent to adjustment to the parameter. The generated or updated matrix, responsive to receiving and validating the sensor data of ACT 704, can be used to at least generate or update a preexisting model or provide an addition model, such as described in ACT 716. The data processing system can use the updated model to, for example, predict that the splice for the tire satisfies the tolerance level (e.g. tolerance window). The data processing system can loop within between at least ACT 704, 708, 712, 716, 720, 724, 728, and 732. The data processing system can terminate the loop based on a trigger initiated via an interface of the data processing system, such as to pause, exit, or initiate the tire manufacturing operation. The data processing system can further terminate the loop responsive to predicting in tolerance splice from adjustments to the parameter of the manufacturing equipment component.

Referring generally back to FIG. 7, the data processing system can receive an updated matrix at ACT 716. The data processing system can provide the updated matrix to the input layer of the machine learning engine. The machine learning engine can, for example, provide an updated information for a preexisting model within the data repository. The data processing system can predict, for example and based on the updated model, a value corresponding to the splice for the tire, as in ACT 720. The data processing system can determine that the value (e.g. tolerance) of the splice, in this case and as an example, does not satisfy the tolerance level or window, at ACT 724. The data processing system can determine a parameter of the manufacturing equipment for adjustment, at ACT 728. The data processing system can therefore adjust at least one of a second parameter of the manufacturing equipment component or a parameter of a second or a third component, at ACT 732. The adjustment can be based on the updated model and responsive to the prediction that the splice for the tire does not satisfy the tolerance window subsequent to the parameter adjustment.

Figure 8:
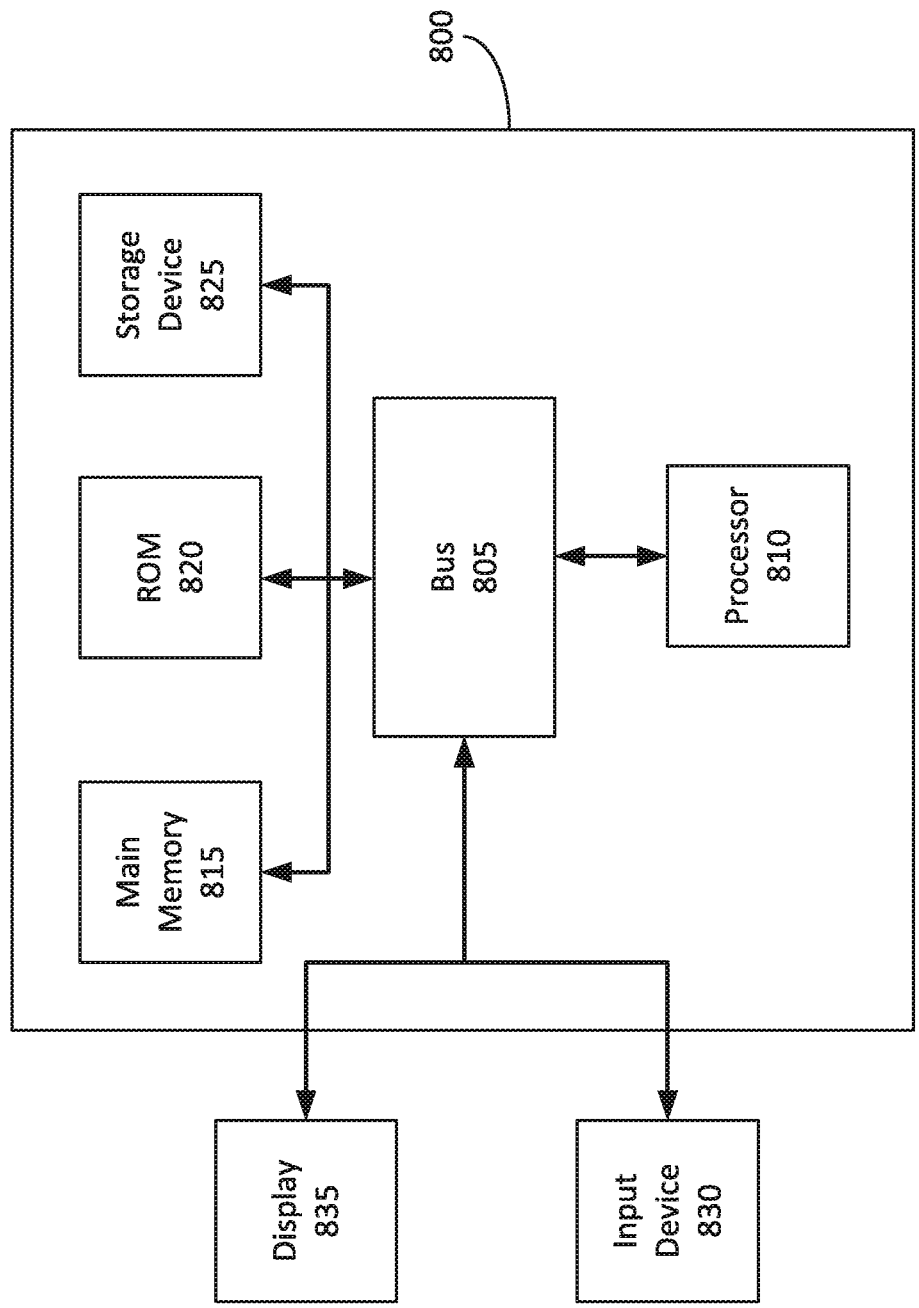
FIG. 8 is a block diagram illustrating an architecture for a computer system that can be employed to implement elements of the systems and methods described and illustrated herein, including, for example, the systems depicted in FIGS. 1-3, operations or examples depicted in FIGS. 4-6, and the method depicted in FIG. 7.

FIG. 8 is a block diagram of an example computing system 800. The computer system 800 (e.g., computing device, computer system, etc.) can include or be used to implement the data processing system 110, or its components such as the data processing system 110. The computing system 800 includes at least one bus 805 or other communication component for communicating information and at least one processor 810 or processing circuit coupled to the bus 805 for processing information. The computing system 800 can also include one or more processors 810 or processing circuits coupled to the bus for processing information. The computing system 800 also includes at least one main memory 815, such as a random access memory ("RAM") or other dynamic storage device, coupled to the bus 805 for storing information, and instructions to be executed by the processor 810. The main memory 815 can be or include the data repository 128. The main memory 815 can also be used for storing various parameters information related to the manufacturing equipment, or other information during execution of instructions by the processor 810. The computing system 800 may further include at least one read only memory ("ROM") 820 or other static storage device coupled to the bus 805 for storing static information and instructions for the processor 810. A storage device 825, such as a solid state device, magnetic disk or optical disk, can be coupled to the bus 805 to persistently store information and instructions.

The computing system 800 may be coupled via the bus 805 to a display 835, such as a liquid crystal display, or active matrix display, for displaying information to a user such as an operator of the manufacturing equipment. An input device 830, such as a keyboard or voice interface may be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835. The display 835 can be part of the data processing system 110, the sensors 108, or other component of FIG. 1.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., arbitration component), and the manufacturing equipment 104 and sensors 108 illustrates one grouping of operations and responsibilities of these system components. Other groupings that execute similar overall operations are understood to be within the scope of this application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (e.g. springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit this disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of this disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

The invention claimed is:

1. A system to manufacture a tire, the system comprising:
one or more processors and a memory, the memory configured to store instructions that are executable by the one or more processors and cause the one or more processors to:
receive, from one or more sensors of one or more pieces of tire manufacturing equipment in a tire manufacturing plant, one or more values corresponding to manufacture of a tire by the one or more pieces of tire manufacturing equipment;
determine one or more metrics based on the one or more values;
generate a matrix based on the one or more values and the one or more metrics;
predict, via input of the matrix into a machine learning model constructed to output tire manufacturing performance data, a value for a splice tolerance metric for the tire, wherein the value for the splice tolerance metric predicts that a first splice of a plurality of splices of the tire exceeds a tolerance window;
determine, based on the value for the splice tolerance metric, a parameter of at least one piece of equipment in the tire manufacturing plant to adjust; and
provide a command to adjust a first parameter used by the at least one piece of equipment in the tire manufacturing plant responsive to the value of the splice tolerance metric, wherein the first parameter includes an amount of pressure applied by the at least one piece of equipment;
receive, subsequent to the adjustment of the first parameter, one or more values corresponding to the manufacture of the tire by the one or more pieces of tire manufacturing equipment;
generate an updated matrix based on the one or more values received subsequent to the adjustment of the first parameter;
predict, via input of the updated matrix into the machine learning model, that the first splice for the tire does not satisfy the tolerance window; and
adjust, responsive to the prediction that the first splice for the tire does not satisfy the tolerance window subsequent to the adjustment, at least one of a second parameter of the at least one piece of equipment or a parameter of a second piece of equipment of the tire manufacturing plant;
receive, subsequent to the adjustment of the second parameter or the parameter of the second piece of equipment, one or more values corresponding to the manufacture of the tire by the one or more pieces of tire manufacturing equipment;
generate an updated matrix based on the one or more values received subsequent to the adjustment of the second parameter or the parameter of the second piece of equipment; and
predict, via input of the updated matrix into the machine learning model, that the first splice for the tire satisfies the tolerance window.

2. The system of claim 1, further comprising:
a model generation component having one or more processors to construct a plurality of machine learning models for each of the one or more pieces of tire manufacturing equipment paired with each of a plurality of splices of the tire, wherein the machine learning model corresponds to one of the plurality of machine learning models.

3. The system of claim 1, wherein the machine learning model is a first machine learning model of a plurality of machine learning models, the one or more processors further caused to:
construct the first machine learning model of the plurality of machine learning models for a first pressure roller component of the one or more pieces of tire manufacturing equipment and the first splice of the tire;
construct a second machine learning model of the plurality of machine learning models for the first pressure roller component and a second splice of the tire;
construct a third machine learning model of the plurality of machine learning models for the first pressure roller component and a third splice of the tire;
construct a fourth machine learning model of the plurality of machine learning models for a second pressure roller component and the first splice of the tire;
construct a fifth machine learning model of the plurality of machine learning models for the second pressure roller component and the second splice of the tire;
construct a sixth machine learning model of the plurality of machine learning models for the second pressure roller component and the third splice of the tire;
construct a seventh machine learning model of the plurality of machine learning models for a third pressure roller component and the first splice of the tire;
construct an eighth machine learning model of the plurality of machine learning models for the third pressure roller component and the second splice of the tire; and construct a ninth machine learning model of the plurality of machine learning models for the third pressure roller component and the third splice of the tire.

4. The system of claim 1, wherein the one or more processors is further caused to train the machine learning model based on a degree to which splices for tires manufactured prior to the tire deviated from a predetermined splice point.

5. The system of claim 1, wherein the one or more processors is further caused to train the machine learning model based on a result of a previous splice, a moving average of a splice point for a predetermined number of periods, or a slope of a predetermined number of moving averages of the splice point.

6. The system of claim 1, wherein the one or more processors is further caused to:
   determine, based on a plurality of machine learning models, that the value for the splice tolerance metric predicts that the first splice of the plurality of splices of the tire exceeds the tolerance window;
   select, based on a policy, the at least one piece of equipment corresponding to the first splice of the plurality of splices of the tire; and
   command the at least one piece of equipment selected based on the policy to adjust a characteristic of the first splice to bring the first splice within the tolerance window.

7. The system of claim 1, wherein the one or more processors is further caused to:
   receive, from the one or more pieces of tire manufacturing equipment, a time series of the one or more values;
   determine, based on the time series of the one or more values, a moving average over a plurality of predetermined periods, wherein the plurality of predetermined periods comprise at least two different predetermined periods;
   determine a slope of the moving average over the plurality of predetermined periods; and generate the matrix based on the slope of the moving average over the plurality of predetermined periods.

8. The system of claim 1, wherein the one or more processors is further caused to:
   identify a confidence score associated with the value for the splice tolerance metric predicted via the machine learning model;
   compare the confidence score with a threshold; and
   determine to adjust the parameter of the at least one piece of equipment responsive to the confidence score satisfying the threshold.

9. A method of manufacturing a tire, the method comprising:
   one or more processors and a memory, the memory configured to store instructions that are executable by the one or more processors and cause the one or more processors to:
   receiving, by one or more processors from one or more sensors of one or more pieces of tire manufacturing equipment in a tire manufacturing plant, one or more values corresponding to manufacture of a tire by the one or more pieces of tire manufacturing equipment;
   determining, by the one or more processors, one or more metrics based on the one or more values;
   generating, by the one or more processors, a matrix based on the one or more values and the one or more metrics;
   predicting, by the one or more processors, via input of the matrix into a machine learning model constructed to output tire manufacturing performance data, a value for a splice tolerance metric for the tire, wherein the value for the splice tolerance metric predicts that a first splice of a plurality of splices of the tire exceeds a tolerance window;
   determining, by the one or more processors based on the value for the splice tolerance metric, a parameter of at least one piece of equipment in the tire manufacturing plant to adjust; and
   providing, by the one or more processors, a command to adjust a first parameter used by the at least one piece of equipment in the tire manufacturing plant responsive to the value of the splice tolerance metric, wherein the first parameter includes an amount of pressure applied by the at least one piece of equipment;
   receiving, by the one or more processors, subsequent to the adjustment of the first parameter, one or more values corresponding to the manufacture of the tire by the one or more pieces of tire manufacturing equipment;
   generating, by the one or more processors, an updated matrix based on the one or more values received subsequent to the adjustment of the first parameter;
   predicting, by the one or more processors, via input of the updated matrix into the machine learning model, that the first splice for the tire does not satisfy the tolerance window; and
   adjusting, by the one or more processors, responsive to the prediction that the first splice for the tire does not satisfy the tolerance window subsequent to the adjustment, at least one of a second parameter of the at least one piece of equipment or a parameter of a second piece of equipment of the tire manufacturing plant;
   receive, subsequent to the adjustment of the second parameter or the parameter of the second piece of equipment, one or more values corresponding to the manufacture of the tire by the one or more pieces of tire manufacturing equipment;
   generate an updated matrix based on the one or more values received subsequent to the adjustment of the second parameter or the parameter of the second piece of equipment; and
   predict, via input of the updated matrix into the machine learning model, that the first splice for the tire satisfies the tolerance window.

10. The method of claim 9, further comprising:
    constructing a plurality of machine learning models for each of the one or more pieces of tire manufacturing equipment paired with each of a plurality of splices of the tire, wherein the machine learning model corresponds to one of the plurality of machine learning models.

11. The method of claim 9, wherein the machine learning model is a first machine learning model of a plurality of machine learning models, the method further comprising:
    constructing the first machine learning model of the plurality of machine learning models for a first pressure roller component of the one or more pieces of tire manufacturing equipment and the first splice of the tire;
    constructing a second machine learning model of the plurality of machine learning models for the first pressure roller component and a second splice of the tire;
    constructing a third machine learning model of the plurality of machine learning models for the first pressure roller component and a third splice of the tire;
    constructing a fourth machine learning model of the plurality of machine learning models for a second pressure roller component and the first splice of the tire;

constructing a fifth machine learning model of the plurality of machine learning models for the second pressure roller component and the second splice of the tire;
constructing a sixth machine learning model of the plurality of machine learning models for the second pressure roller component and the third splice of the tire;
constructing a seventh machine learning model of the plurality of machine learning models for a third pressure roller component and the first splice of the tire;
constructing an eighth machine learning model of the plurality of machine learning models for the third pressure roller component and the second splice of the tire; and
constructing a ninth machine learning model of the plurality of machine learning models for the third pressure roller component and the third splice of the tire.

12. The method of claim 9, further comprising:
training the machine learning model based on a degree to which splices for tires manufactured prior to the tire deviated from a predetermined splice point.

13. The method of claim 9, further comprising:
constructing the machine learning model based on a result of a previous splice, or a moving average of a splice point for a predetermined number of periods, or a slope of a predetermined number of moving averages of the splice point.

14. The method of claim 9, further comprising:
determining, based on a plurality of machine learning models, that the value for the splice tolerance metric predicts that the first splice of the plurality of splices of the tire exceeds the tolerance window;
selecting, based on a policy, the at least one piece of equipment corresponding to the first splice of the plurality of splices of the tire; and
commanding the at least one piece of equipment selected based on the policy to adjust a characteristic of the first splice to bring the first splice within the tolerance window.

15. The method of claim 9, further comprising:
receiving, from the one or more pieces of tire manufacturing equipment, a time series of the one or more values;
determining, based on the time series of the one or more values, a moving average over a plurality of predetermined periods, wherein the plurality of predetermined periods comprise at least two different predetermined periods;
determining a slope of the moving average over the plurality of predetermined periods; and
generating the matrix based on the slope of the moving average over the plurality of predetermined periods.

16. The method of claim 9, further comprising:
identifying a confidence score associated with the value for the splice tolerance metric predicted via the machine learning model;
comparing the confidence score with a threshold; and
determining to adjust the parameter of the at least one piece of equipment responsive to the confidence score satisfying the threshold.

* * * * *